United States Patent
Shum et al.

[19]

[11] Patent Number: 6,084,592
[45] Date of Patent: Jul. 4, 2000

[54] INTERACTIVE CONSTRUCTION OF 3D MODELS FROM PANORAMIC IMAGES

[75] Inventors: Heung-Yeung Shum, Bellevue, Wash.; Mei Han, Pittsburgh, Pa.; Richard S. Szeliski, Bellevue, Wash.

[73] Assignee: Microsoft Corporation, Redmond, Wash.

[21] Appl. No.: 09/099,161

[22] Filed: Jun. 18, 1998

[51] Int. Cl.[7] .................................................. G06F 15/00
[52] U.S. Cl. ............................................................ 345/425
[58] Field of Search ..................................... 345/419, 425, 345/426, 427, 474, 475

[56] References Cited

U.S. PATENT DOCUMENTS

| | | | |
|---|---|---|---|
| 5,175,806 | 12/1992 | Muskovitz et al. | 345/425 |
| 5,761,401 | 6/1998 | Kobayashi et al. | 345/430 |

OTHER PUBLICATIONS

S. Bougnoux and L. Robert. Totalcalib: a fast and reliable system for off–line calibration of image sequences. In CVPR'97, Jun. 1997. The Demo Session.
[BB95] S. Becker and V. M. Bove. Semiautomatic 3–D model extraction from uncalibrated 2–D camera views. In SPIE vol. 2410, Visual Data Exploration II, pp. 447–461, Feb. 1995.
Zha97[ Z. Zhang. Determining the epipolar geometry and its uncertainty: A review. IJCV]98, vol. 27, No. 2, pp. 161–195, Mar. 1998.
[CW90] R. T. Collins and R. S. Weiss. Vanish point calculation as a statistical inference on the unit sphere. In ICCV'90, pp. 400–403, Dec. 1990.
[FSL+95] O. D. Faugeras, Laveau S., Robert L., Csurka G., and Zeller C. 3–D reconstruction of urban scenes from sequences of images. Technical Report 2572, INRIA, 1995.
[WH88] E. L. Walker and M. Herman. Geometric reasoning for constructing 3D scene descriptions from images. Artificial Intelligence, 37:275–290, 1988.

[Har89] R. M. Haralick, Determining camera parameters from the perspective projection of a rectangle. Pattern Recognition, 22(3):225–230, 1989.
[KS96] S. B. Kang and R. Szeliski. 3–D scene data recovery using omnidirectional multibaseline stereo. In CVPR'96, pp. 364–370, Jun. 1996.
[KW97] S. B. Kang and R Weiss. Characterization of errors in compositing panoramic images. In CVPR'97, pp. 103–109, Jun. 1997.

(List continued on next page.)

*Primary Examiner*—Phu K. Nguyen
*Attorney, Agent, or Firm*—Lyon Harr &DeFrank; Richard T. Lyon

[57] ABSTRACT

An interactive computer-implemented system and process for constructing a model of a 3D scene from a panoramic view of the scene that includes a user interface for dynamically interfacing a user to a computing device. In the constructed model, the 3D scene is represented by sets of connected planes. The modeling begins by providing the user with a display of an image of the panoramic view of the 3D scene on a monitor screen. The user is then required to specify information concerning certain geometric features of the scene on the screen image. A computer program executable by the computing device recovers a camera orientation matrix of the panoramic view based on the features specified by the user. Plane normals and line directions of each plane in the 3D scene which is to be modeled are estimated using this matrix as well as the user-specified information. A camera translation is also recovered, as are plane distances and vertex point locations for each plane in the 3D scene being modeled, using the user-supplied information, the recovered camera orientation matrix, and the estimated plane normals and line directions. The model of the 3D scene is then constructed based on the plane normal and plane distance, and/or the vertex point locations, of each plane in the set.

136 Claims, 20 Drawing Sheets

(2 of 20 Drawing Sheet(s) Filed in Color)

OTHER PUBLICATIONS

[MB95] L. McMillan and G. Bishop. Plenoptic modeling: An image–based rendering system. SIGGRAPH'95, pp. 39–46, Aug. 1995.

[SK97] H. S. Sawhney and R. Kumar. True multi–image align–ment and its application to mosaicing and lens distor–tion correc–tion. In CVPR'97, pp. 450–456, Jun. 1997.

[SS97a] H.–Y. Shum and R. Szeliski. Construction and refinement of panoramic mo–saics with global and local alignment. In ICCV'98, pp. 953–958, 1998.

[SS97b] R. Szeliski and H. Y. Shum. Creating full view panoramic image mosaics and texture–mapped models. SIG–GRAPH'95, pp. 251–258, Aug. 1997.

[Ste95] G. Stein. Accurate internal camera calibration using rotation, with analysis of sources of error. In ICCV95, pp. 230–236, Jun. 1995.

[TDM96] C. J. Taylor, P. E. Debevec, and J. Malik. Recon-struct–ing polyhedral models of architectural scenes from photographs. In ECCV'96, vol. 2, pp. 659–668, Apr. 1996.

DETERMINE THE CAMERA ORIENTATION MATRIX ($R=[r_x, r_y, r_z]$)
FROM AT LEAST A VERTICAL AND 1 HORIZONTAL LINES
(OR 2 HORIZONTAL AND 1 VERTICAL LINES)

500 — FOR EACH DESIGNATED LINE, IDENTIFY THE PANORAMIC VIEW COORDINATES OF 2 POINTS (i.e., $x_1', x_2'$) ON THE LINE (PREFERABLY THE END POINTS OF THE LINE) FROM CORRESPONDING POINTS IN THE SCREEN IMAGE

502 — FOR EACH OF THE DESIGNATED LINES, COMPUTE THE NORMAL ($n_p'$) OF THE PROJECTION PLANE DEFINED BY THE POINTS ($x_1', x_2'$) AND THE "CAMERA CENTER" ($O_c$) (i.e., $n_p' = x_1' \times x_2'$)

HAVE MORE THAN TWO PARALLEL LINES BEEN DESIGNATED BY THE USER? — YES → TO FIG. 5B (1)

NO ↓

HAVE 2 VERT. AND 1 HORZ. LINES BEEN DESIGNATED BY THE USER? — YES → TO FIG. 5C (2)

NO ↓

HAVE 2 HORZ. AND 1 VERT. LINES BEEN DESIGNATED BY THE USER? — YES → TO FIG. 5D (3)

FIG. 5A

FROM
FIG. 7C

③
↓

722

COMPUTE THE DIRECTION ($m_2$) OF THE LINE IN THE 3D
SCENE CORRESPONDING TO THE THIRD (NON-PARALLEL)
DESIGNATED LINE FROM THE PREVIOUSLY COMPUTED LINE
DIRECTION ($m_1$) AND THE PROJECTION PLANE NORMAL ($n_{p2}'$)
ASSOCIATED WITH THE THIRD DESIGNATED LINE AFTER BEING
PROJECTED INTO 3D SCENE COORDINATES USING THE
CAMERA ORIENTATION MATRIX (R)

(i.e., $m_2 = m_1 \times n_{p2}$, WHERE $n_{p2} = R^T n_{p2}'$)

724

COMPUTE THE NORMAL (n) OF THE CORRESPONDING
PLANE IN THE 3D SCENE FROM THE TWO 3D SCENE
LINE DIRECTIONS ($m_1, m_2$) ASSOCIATED WITH THE PLANE (i.e., $n = m_1 \times m_2$)

FIG. 7D

RECOVERY OF PLANE DISTANCE (d), POINTS (x)
AND OPTIONALLY CAMERA TRANSLATION (t)

900 — USER DESIGNATES VARIOUS PARAMETERS INCLUDING POINTS ($x''$), PLANE NORMALS ($n''$), LINE DIRECTIONS ($m''$), PLANE DISTANCES ($d''$) AND OTHER GEOMETRIC RELATIONSHIPS SUCH AS PARALLEL PLANES ASSOCIATED WITH THE 3D SCENE IN THE SCREEN IMAGE

902 — EMPLOY THE SPECIFIED 3D SCENE PARAMETERS ($x'', n'', m'', d''$) AND ALL COMPUTED 3D PARAMETERS ($n, m$) TO CREATE A LINEAR SYSTEM CONSISTING OF ALL POSSIBLE CONSTRAINTS FOR EACH SET OF CONNECTED PLANES IN THE SCENE, i.e.,

KNOWN POINT —— $x_i''$

KNOWN PLANE DISTANCE —— $d_i''$

PARALLEL PLANES —— $d_i - d_j =$ CONST.

POINT/MODEL —— $(x - t) \cdot p_j = 0$

POINT/PLANE —— $x_i \cdot n_k'' + d_k = 0$

POINT/PLANE —— $x_i \cdot n_k + d_k = 0$

POINTS/LINE —— $(x_i - x_j) \times m'' = 0$

POINTS/LINE —— $(x_i - x_j) \times m = 0$

KNOWN LENGTH —— $x_i - x_j = cm''$

KNOWN LENGTH —— $x_i - x_j = cm$

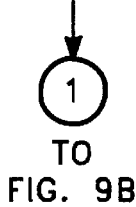

INTERACTIVE CONSTRUCTION OF 3D MODELS FROM PANORAMIC IMAGES

BACKGROUND

1. Technical Field

The invention is related to a computer-implemented system and process for constructing a model of a 3D scene from a panoramic view of the scene, and more particularly, to such a system and process where the panoramic view is displayed as a screen image and the model is constructed based on information provided interactively by a user on the screen image.

2. Background Art

A great deal of effort has been expended on 3D scene reconstruction from image sequences (with calibrated or un-calibrated cameras, e.g., [FSL+95]) using computer vision techniques. Unfortunately, the results from most automatic modeling systems are disappointing and unreliable due to the complexity of the real scene and the fragility of the vision techniques. Part of the reason is the demand for accurate correspondences (e.g., point correspondence) required by many computer vision techniques such as stereo and structure from motion. Moreover, such correspondences may not be available if the scene consists of large un-textured regions.

Fortunately, for many real scenes, it is relatively straightforward to interactively specify corresponding points, or lines, or planes. For example, the interiors and exteriors of buildings provide vertical and horizontal lines, as well as parallel and perpendicular planes. These constraints have been exploited in several interactive modeling systems. For example, PhotoModeler (by Eos Systems Inc. of Vancouver, BC, Canada) is a commercial product which constructs 3D models from several images, using photogrammetry techniques and manually specified points. However, explicit camera calibration is necessary with this system. The Total-Calib system, on the other hand, estimates the fundamental matrix from a few selected matched points [BR97]. It then predicts other possible matching points from one image to others. In Becker's modeling system, the problem of lens distortion (encountered in images taken with wide field of view lenses) is also considered [BB95]. By employing the known structure of building exteriors, the Facade system directly recovers a solid 3D model (blocks) from multiple images [TDM96]. However, none of these systems employs panoramic images as does the present invention.

It is noted that in the preceding paragraphs, as well as in the remainder of this specification, the description refers to various individual publications identified by an alphanumeric designator contained within a pair of brackets. For example, such a reference may be identified by reciting, "reference [BR97]" or simply "[BR97]". Multiple references will be identified by a pair of brackets containing more than one designator, for example, [BR97, BB95, TDM96]. A listing of the publications corresponding to each designator can be found at the end of the Detailed Description section.

SUMMARY

The present invention relates to an interactive modeling system and process that constructs models of a 3D scene from a panoramic view of the scene. A user interface is employed to facilitate an exchange of information about the 3D scene between a user, and a computer-implemented modeler that constructs 3D models based on the user-supplied information.

The panoramic view or panorama employed in the present system and process is essentially a mosaic consisting of a set of images taken around the same viewpoint, which have been registered together to form one large image. As mentioned previously, this differs from previous modeling systems in that it uses panoramic image mosaics (therefore large fields of view), instead of multiple images (generally small fields of view). Such a modeling approach has much less ambiguity than traditional structure from motion approaches because it uses these wide field of view images, and therefore obtains a better estimate of camera rotation. Panoramas also offer several other advantages over regular images. First, the modeling problem can be decoupled into a zero baseline problem (building a panorama from images taken with rotating camera) and a wide baseline stereo or structure from motion problem (recovering a 3D model from the panorama). Second, the camera calibration problem is implicitly recovered as part of the panorama construction [(Ste95, KW97, SK97]. Further, due to recent advances, it is now possible to construct panoramas with hand-held cameras [SS97b], thereby making panoramic images readily obtainable. It should be noted that the system and process of the present invention could also handle calibrated (non-panoramic) images as well. These images would simply be treated as narrow field of view panoramas. However, the recovered 3D model will not be as accurate with narrow field of view images, and so the use of these types of images is not preferred.

One of the keys to the present invention is its reliance on user-supplied information about the 3D scene being modeled. Previous work on 3D reconstruction from panoramas [MB95, KS96] has not attempted to exploit important regularities present in the environment, such as walls with known orientations. However, the structures associated with the manmade environment are full of regularities such as parallel lines, lines with known directions, planes with lines and points on them, etc., which can be taken advantage of in the modeling process [WH88]. Using these constraints, a fairly complex 3D model can be constructed from even a single panorama.

In general, the present system and process involves first displaying an image of the panoramic view of the 3D scene on a computer monitor screen. The camera orientation matrix of the panoramic view is then recovered based on user-specified lines associated with at least one plane of the 3D scene. The user specifies lines by designating the location of two points of the line (preferably the end points) on the screen image and inputting the direction of the corresponding line in 3D scene (e.g., vertical or horizontal). A line is then displayed on the screen image between the two designated points. The camera orientation matrix can be computed if the user specifies at least two vertical lines and one horizontal line of the 3D scene on the plane or at least two horizontal lines and one vertical line of the 3D scene. The camera orientation matrix can also be derived if the user specifies at least two sets of parallel lines of the 3D scene.

The next step of the process is to estimate plane normals and line directions for each plane in the 3D scene. This is generally accomplished by the user "drawing" either two pairs of parallel lines (e.g., a parallelogram) or three lines of a rectangle on each plane in the screen image that is to be modeled. The user "draws" these lines, as before, by designating the location of two points of a line for every line "drawn" on the screen image. Once the required lines have been drawn on a plane in the screen image, the direction of the corresponding line in the 3D scene is derived using the camera orientation matrix. Finally, a normal for each plane being modeled in the 3D scene is computed from the previously derived line directions associated with that plane.

A camera translation, which is defined as the difference between a so-called camera projection center and the coordinate origin of the 3D scene, can be derived next if desired. The camera projection center corresponds to the coordinate origin of the panoramic view projected into the 3D scene. The camera translation is derived by the user identifying the location of at least two points in the screen image and specifying their 3D scene coordinates. A way of characterizing the conversion of a point in the 3D scene to a corresponding point in the panoramic view is to employ the relationship, $(x-t) \cdot (R^T p_j') = 0$, $j=0, 1, 2$ where x represents the coordinates of a point in the 3D scene, t represents the camera translation, R represents the camera orientation matrix, x' represents the coordinates of a point in the panoramic view which corresponds to the point x in the 3D scene and $P_0'=(-x_2, x_1, 0)$, $p_1'=(-x_3, 0, x_1)$ and $p_2'=(0, -x_3, X_2)$ represent three directions perpendicular to a ray from the camera center through the point $x'=(x_1, x_2, x_3)$. Thus using the two or more user specified points, a system of linear equations can be created and solved for the camera translation using a least-squares approach.

In the preferred 3D scene modeling system and process embodying the present invention, the 3D scene is represented by sets of connected planes. If all the structures of the 3D scene are connected, then only one set of planes is needed. If however, the scene is made up of two or more unconnected structures, the 3D scene is represented by a corresponding number of connected plane sets. Each plane used to model the 3D scene is defined by its plane normal and plane distance, and/or by its vertex point locations. Thus, these parameters are obtained to complete the modeling procedure. The scene parameters are found, along with the camera translation if it has not already been recovered, by creating a system of linear geometric constraint equations. The system of equations employs all available geometric constraints and includes various scene parameters such as user-designated 3D scene points, plane normals, line directions, plane distances and parallel plane designations, as well as the previously estimated plane normals and line directions. The system of equations is then solved for all the unknown plane distances and vertex point locations (and possibly the camera translation) using a least-squares approach. A system of equations is created for each unconnected structure in the 3D scene and individually solved for all unknown parameters. Once all the planes that are to be modeled in each unconnected structure within the 3D scene are defined, the model is constructed and displayed as desired.

It is noted that the present modeling system and process also has the capability to ascertain whether the user has designated a sufficient number of lines to determine the camera orientation matrix, and derive the line directions and plane normal associated with the corresponding plane in the 3D scene. The user is prompted via an appropriate screen image to designate additional lines plane whenever it is ascertained there are not a sufficient number to determine aforementioned information.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing (s) will be provided by the U.S. Patent and Trademark Office upon request and payment of the necessary fee.

The specific features, aspects, and advantages of the present invention will become better understood with regard to the following description, appended claims, and accompanying drawings where:

FIGS. 5A through 5D are block diagrams of a process for accomplishing the sub-module for determining the camera orientation matrix using at least two user-specified vertical lines and one horizontal line (or two horizontal and one vertical) associated with the process of FIGS. 4A & 4B.

FIGS. 7A through 7D are block diagrams of a process for accomplishing the plane normal and line direction estimation program module of the overall process of FIG. 3.

FIGS. 9A & 9B are block diagrams of a process for accomplishing the plane distance, vertex point location, and optional camera translation recovery program module of the overall process of FIG. 3.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
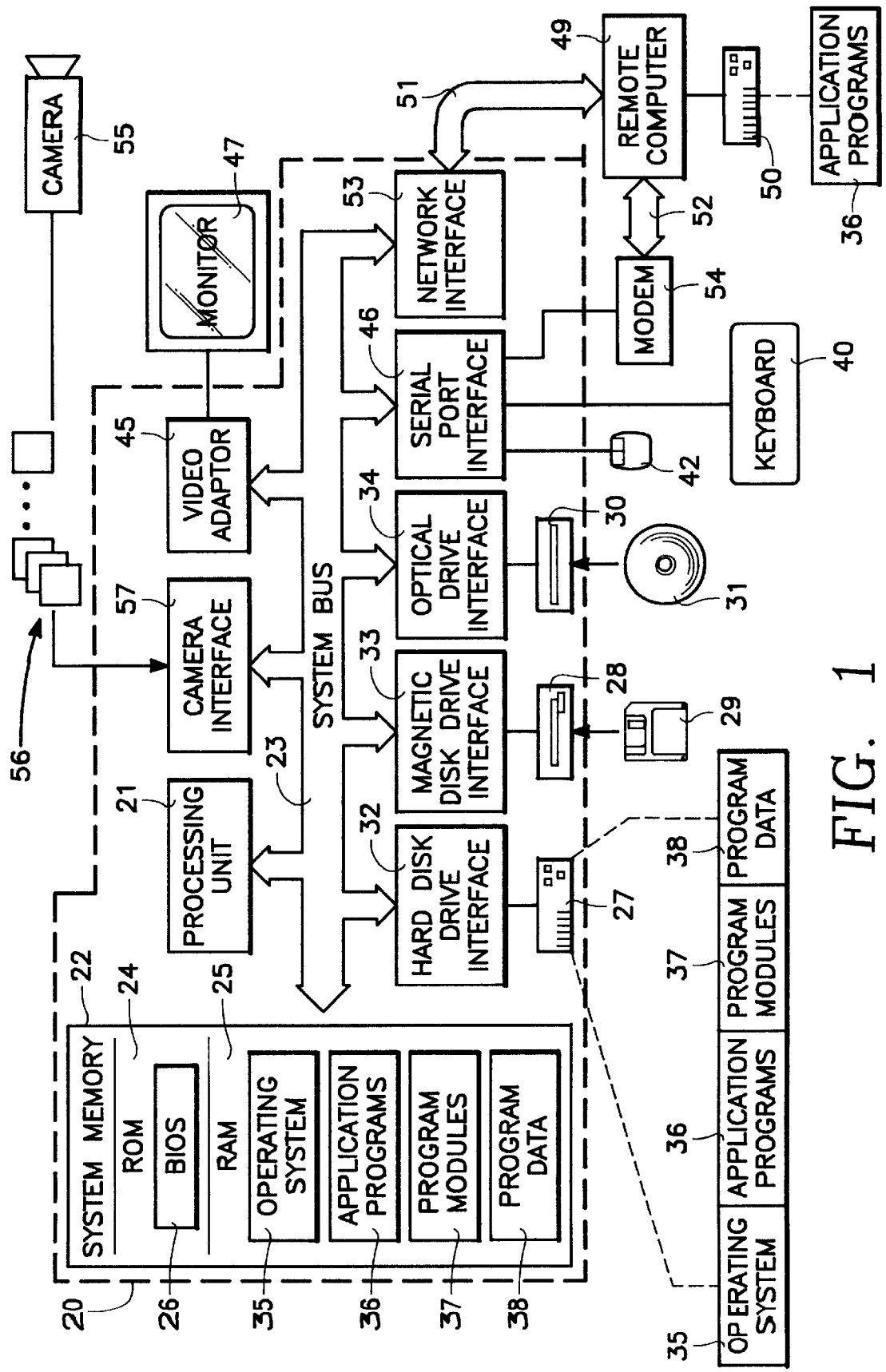
FIG. 1 is a diagram depicting a general purpose computing device constituting an exemplary system for implementing the present invention.

FIG. 1 and the following discussion are intended to provide a brief, general description of a suitable computing environment in which the invention may be implemented.

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
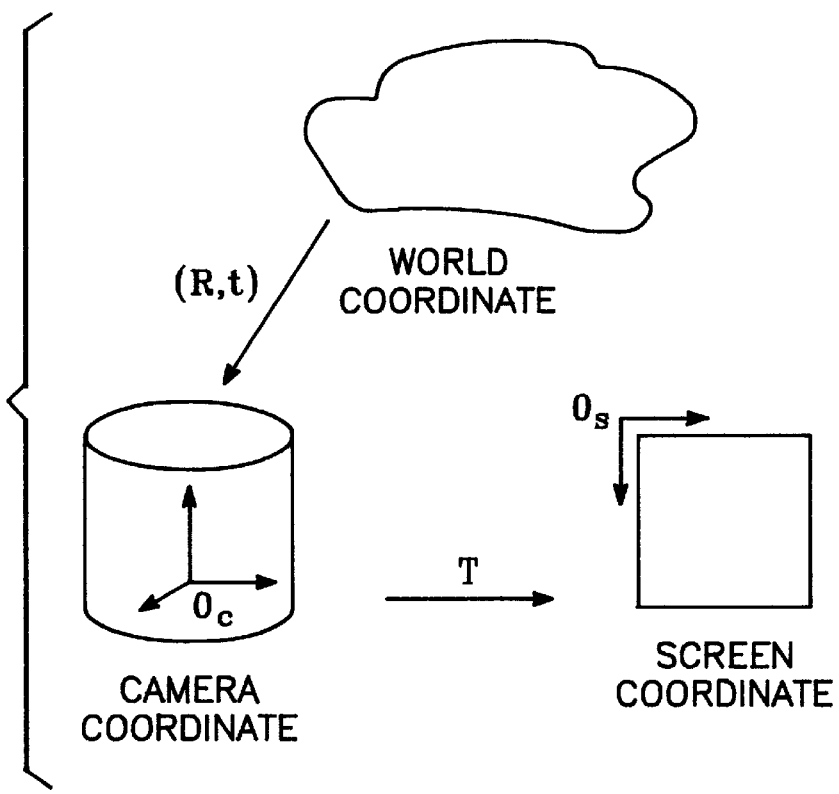
FIG. 2 is a diagram graphically depicting the various coordinate systems employed with the present invention.

The exemplary operating environment having now been discussed, the remaining part of this description section will be devoted to a description of the program modules embodying the invention and the testing of these modules. Three separate coordinate systems are referred to throughout the following description. As illustrated in FIG. 2, the first coordinate system is the world coordinate system where the 3D model geometry (planes, lines, vertices) is defined. Coordinates in this first system will be referred to as 3D scene coordinates. The second coordinate system is the "2D" camera coordinate system associated with a panoramic view of the 3D scene to be modeled, hereinafter referred to as panorama or panoramic view coordinates. The panorama coordinates are referred to as being 2D because each point on the panorama has only two degrees of freedom because its distance from the camera is not known. The third coordinate system is the screen coordinate system associated with a screen image (such as one appearing on the computer monitor 47 of FIG. 1) of the panoramic view employed as a user interface. It is noted that the screen image can be zoomed and rotated via conventional methods to facilitate user interaction.

The 3D model is represented by a set of connected planes and their associated points and lines. Each point is represented by its 3D coordinate x. Each line is represented by its line direction m and points on the line. Each plane is characterized by its normal n and its plane distance d, and/or its vertex point locations. The plane distance is defined as the distance from the 3D coordinate origin to a plane along a line normal to the plane, assuming the plane is infinite. Also note that $n \cdot x + d = 0$ or $(n, d) \cdot (x, 1) = 0$.

A panorama consists of a collection of images and their associated transformations and constitutes a panoramic view of the 3D scene being modeled. A 2D point x' (i.e., on a panorama) represents a ray going through the 2D model origin (i.e., camera optical center $O_c$). Likewise, a 2D line (represented by its line direction m') lies on the "line projection plane" (with normal $n_p'$) which passes through the line and 2D model origin (FIG. 2). Therefore, a line direction in a 2D model cannot be uniquely determined by just two points.

Figure 3:
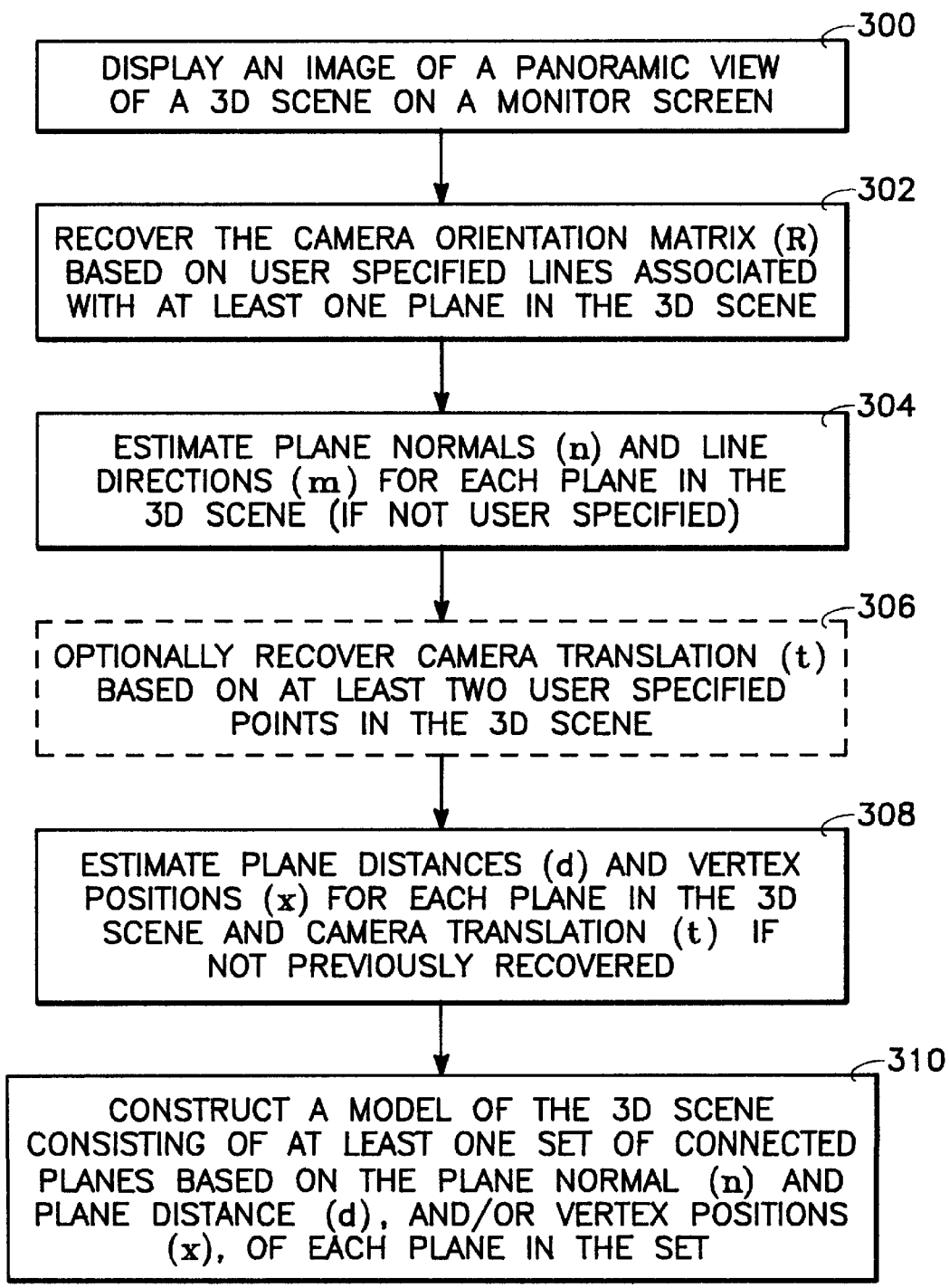
FIG. 3 is a block diagram of an overall process for constructing a model of a 3D scene from a panoramic view of the scene according to the present invention.

Many geometric constraints exist in real scenes. For example, there may be known features like points, lines, and planes. Or there may be known relationships such as parallel and vertical lines and planes, points on a line or a plane. Some of these constraints are bilinear. For example, a point on a plane is a bilinear constraint in both the point location and the plane normal. However, plane normals and line directions can be recovered without knowing plane distance and points. Thus, it is possible to decouple the modeling process into several linear steps. As illustrated in FIG. 3, the high-level structure of the modeling process involves the steps of:

displaying the image of the panoramic view of a 3D scene on the screen of a computer monitor (step 300);

recovering a camera orientation matrix (R) associated with the panoramic view from user-designated lines and line directions (step 302);

estimating plane normals (n) and line directions (m) using the camera orientation matrix (step 304);

optionally recovering camera translation (t) from user-specified points (step 306);

estimating plane distances (d) and vertex point locations (x), as well as the camera translation if not previously recovered, using the estimated plane normals and line directions (step 308);

constructing a model of the 3D scene based on the estimated plane distances and vertex point locations (step 310).

These steps are explained in detail in the next sections.

1. Recovering the Camera Orientation Matrix (R)

This section discusses how to recover the camera orientation matrix (R) from user-designated lines and line directions. The camera orientation matrix describes the relationship between the 2D model (panorama coordinate system) and the 3D model (world coordinate system).

Figure 4C:
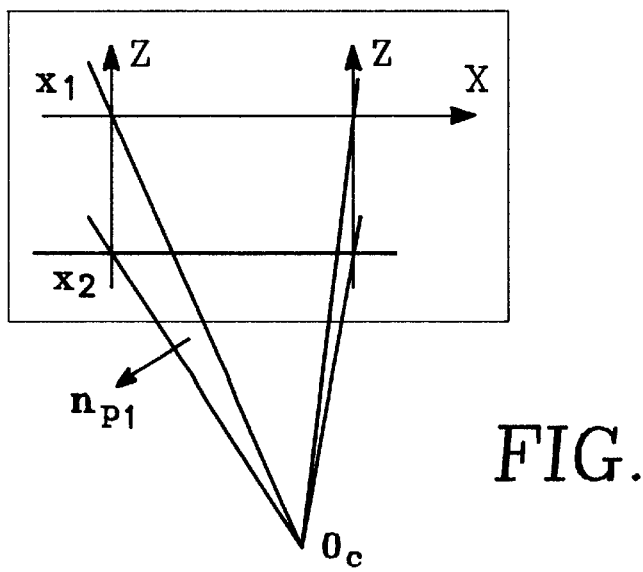
FIG. 4C is a diagram graphically depicting projection planes formed by user-specified lines on a plane in the panoramic view and the camera center of the panoramic view.
Figure 4A:
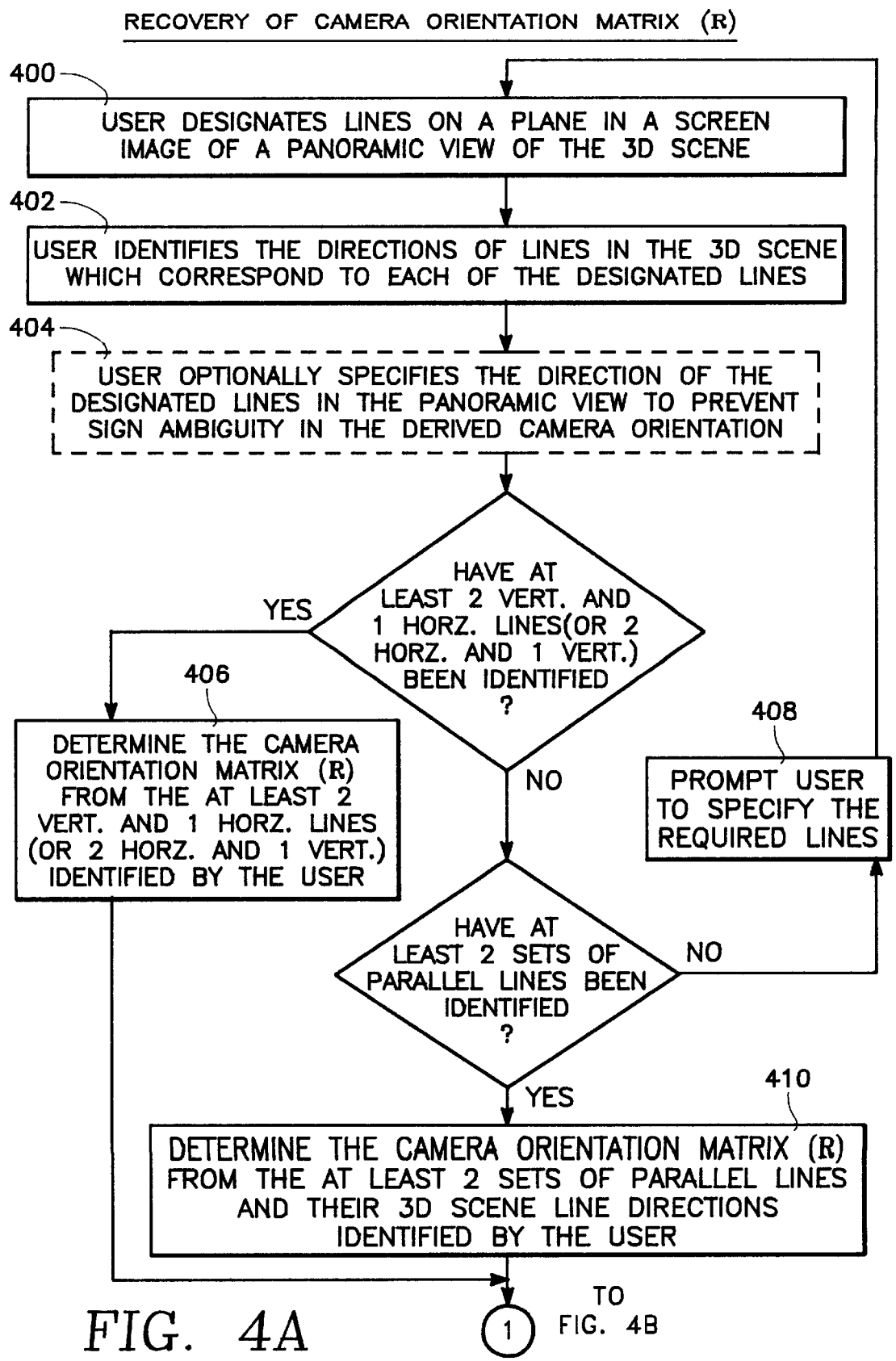
FIGS. 4A & 4B are block diagrams of a process for accomplishing the camera orientation matrix recovery program module of the overall process of FIG. 3.
Figure 4B:
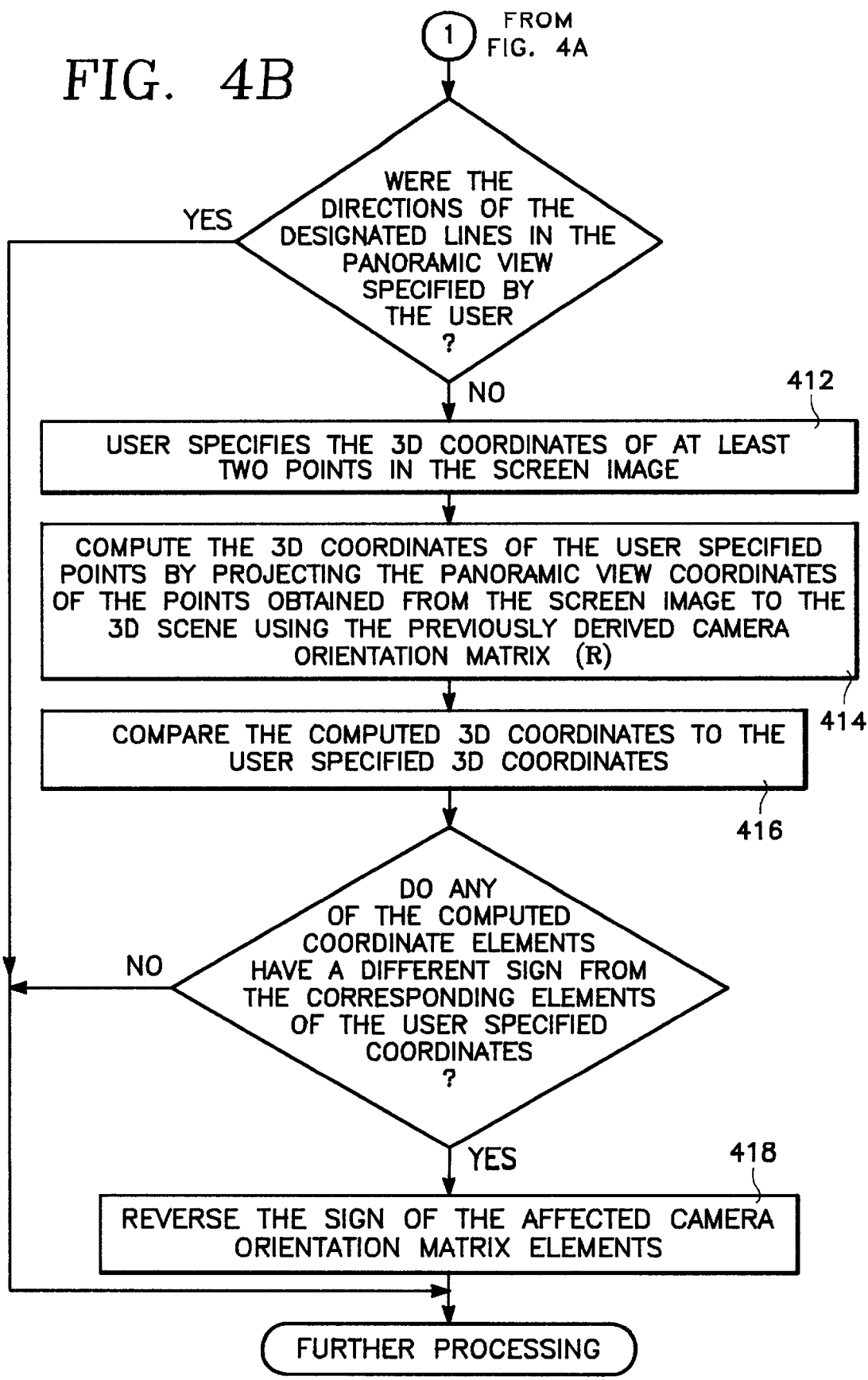

Referring to FIGS. 4A and 4B, the camera orientation matrix is generally recovered using lines designated by the user on at least one plane in the screen image (step 400) and the direction of these lines in the 3D scene (step 402). In a preferred embodiment of the present invention, a user designates a line on the screen image by specifying two points of the line, preferably the end points. A line appears between the specified points in the screen image for the benefit of the user. As stated previously, the user is also required to identify the direction the designated lines would have in the 3D scene being modeled. This is readily accomplished given the abundance of known vertical and horizontal lines associated with man-made structures in a real world 3D scene. For example, one can easily draw several vertical lines at the intersections of walls and mark them to be parallel to the Z axis of the world coordinate system.

1.1 Determining the Camera Orientation Matrix (R) from Two Vertical Lines & One Horizontal Line (or Two Horizontal & One Vertical)

Referring to FIG. 4A, given that at least two 3D scene vertical lines and a 3D scene horizontal line are designated on a plane of the screen image by the user, the camera rotation matrix can be recovered (step 406). Each line forms a projection plane (with normal $n_p'$) through the camera origin, as depicted in FIG. 4C. Referring to FIG. 5A, the panorama coordinates of two points $(x_1', x_2')$ on each line designated by the user in the screen image are first identified from the corresponding points in the screen image (step 500). Preferably, these two points are the end points of the line. It is noted that the conversion between screen image coordinates and panorama coordinates is straight forward process. If a point (e.g., a pixel) has a screen image coordinate of (u, v, 1), its corresponding 2D point in the panoramic view is represented by (u, v, f), where f is the camera focal length.

Given the two points $x_1'$ and $x_2'$ on each line, the projection plane normals $(n_p')$ can be computed by the cross product $n_p' = x_1' \times x_2'$ (step 502). The length of $n_p'$ is a good confidence (or certainty) measure of the normal $n_p'$.

Let the camera orientation matrix $(R) = [r_x r_y r_z]$. Each vertical line parallel to the Z axis (and the plane formed with the origin) gives a constraint $n_p' \cdot r_z = 0$. From two known vertical lines, $n_{p1}' \cdot r_z = 0$, and $n_{p2}' \cdot r_z = 0$, thus $r_z = n_{p1}' \times n_{p2}'$. Accordingly, the Z-axis element $(r_z)$ of the camera orientation matrix can be computed using the projection plane normals for the two user-designated vertical lines (step 508), as shown in FIG. 5C. Note that there is a sign ambiguity for the recovered $r_z$.

With a known horizontal line of the 3D scene (e.g., parallel to the X axis), there is a constraint on $r_x$, i.e., $n_{pj}' \cdot r_x = 0$. Thus, the X-axis element $(r_x)$ of the camera orientation matrix can be computed using the previously derived Z-axis element $(r_z)$ and the projection plane normal associated with the user-designated horizontal line (step 510), i.e. $r_x = r_z \times n_{pj}'$ because $r_z \cdot r_x = 0$. Again there is a sign ambiguity for the recovered $r_x$. Finally, the Y-axis element $(r_y)$ can be computed from the previously derived Z-axis $(r_z)$ and X-axis $(r_x)$ elements, i.e. $r_y = r_z \times r_x$ to complete the camera orientation matrix (step 512).

The camera orientation matrix can also be computed if two horizontal lines (e.g., parallel to the X axis) and a vertical line are known. As shown in FIG. 5D, the X-axis element $(r_x)$ of the camera orientation matrix can be computed using the projection plane normals for two user-designated horizontal lines (step 514). Note again that there is a sign ambiguity for the recovered $r_x$. The Z-axis element $(r_z)$ of the camera orientation matrix can then be computed using the previously derived X-axis element $(r_x)$ and the projection plane normal associated with the user-designated vertical line (step 516), i.e. $r_z = r_x \times n_{pj}'$. Again there is a sign ambiguity for the recovered $r_z$. Finally, the Y-axis element $(r_y)$ can be computed from the previously derived X-axis $(r_x)$ and Z-axis $(r_z)$ elements, i.e. $r_y = r_x \times r_z$ to complete the camera orientation matrix (step 518).

Figure 6:
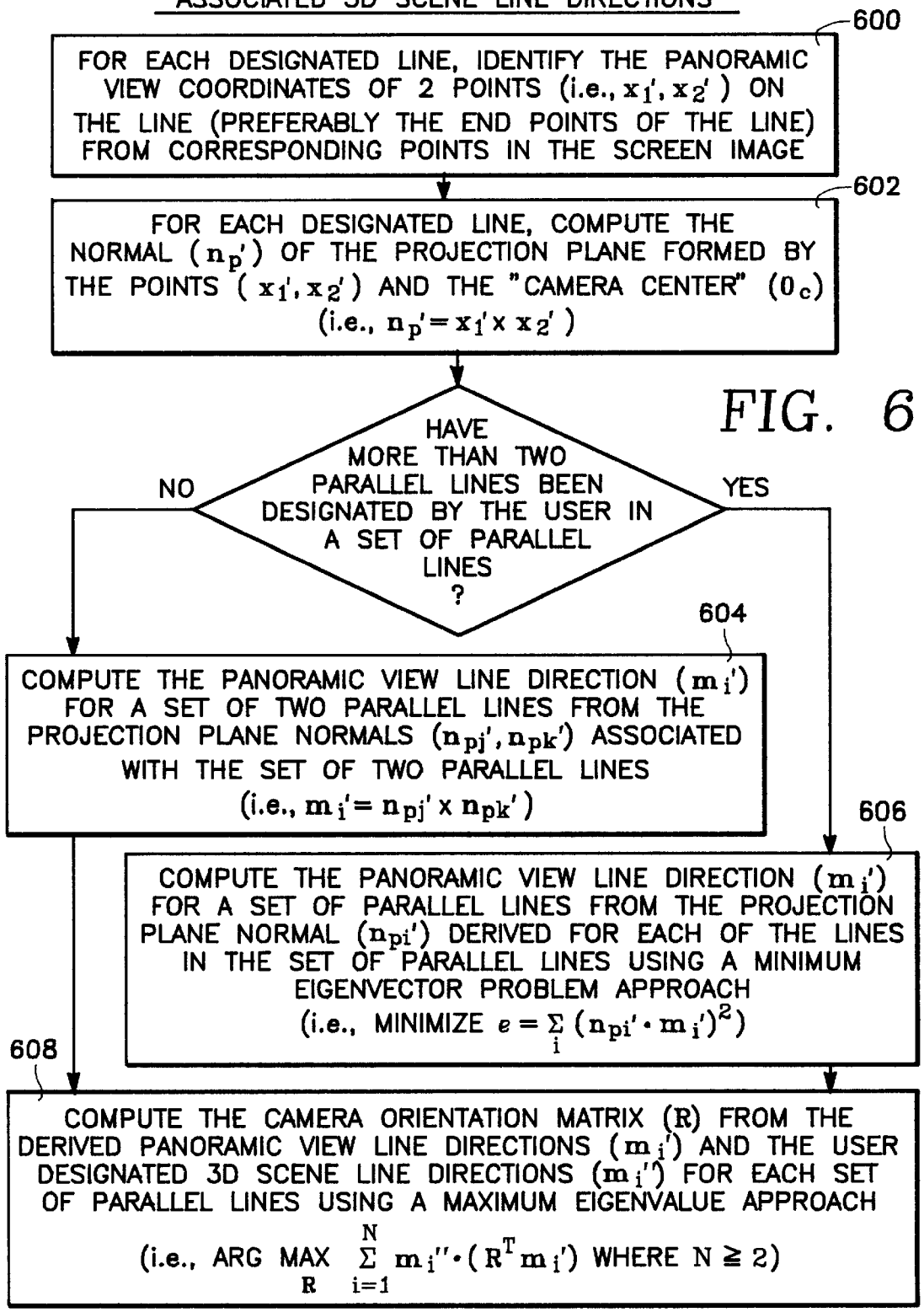
FIG. 6 is a block diagram of a process for accomplishing the sub-module for determining the camera orientation matrix using at least two sets of user-specified parallel lines and their user-specified 3D scene line directions associated with the process of FIGS. 4A & 4B.

1.2 Determining the Camera Orientation Matrix (R) from Two Sets of Parallel Lines & Their Associated 3D Scene Line Directions Referring to FIG. 4A once again, given the user designates in the screen image at least two sets of parallel lines and identifies the direction of these lines in the 3D scene, the camera rotation matrix can be recovered (step 410). FIG. 6 shows how this is accomplished using all constraints available and a unit quaternion approach. First, the panorama coordinates of two points ($x_1'$, $x_2'$) on each of the parallel lines designated by the user in the screen image are identified from the corresponding screen image points (step 600). Here again, it is preferred the points correspond to the end points of lines. Given the two points, the projection plane normal ($n_p'$) for each line can be computed, i.e. $n_p' = x_1' \times x_2'$ (step 602). As shown above in the case where two vertical or horizontal lines were designated, given a pair of parallel lines with "line projection plane" normals as $n_{pj}'$ and $n_{pk}'$, the line direction $m_i'$ can be estimated as $n_{pj}' \times n_{pk}'$ (step 604). Rather than normalizing $m_i'$, it can be left un-normalized since its magnitude denotes a confidence in this measurement. Given the user-designated true line directions $m_i''$ in the world coordinate and the derived panorama line directions ($m_i'$), the camera orientation matrix estimation can be formulated as:

$$\arg\max_R \sum_{i=1}^{N} m_i'' \cdot (R^T m_i') \tag{1}$$

with $N \geq 2$, which leads to a maximum eigenvalue problem using unit quaternion (step 608).

However, the resulting camera rotation R can still be ambiguous due to the sign ambiguities in line directions m'.

Figure 5B:
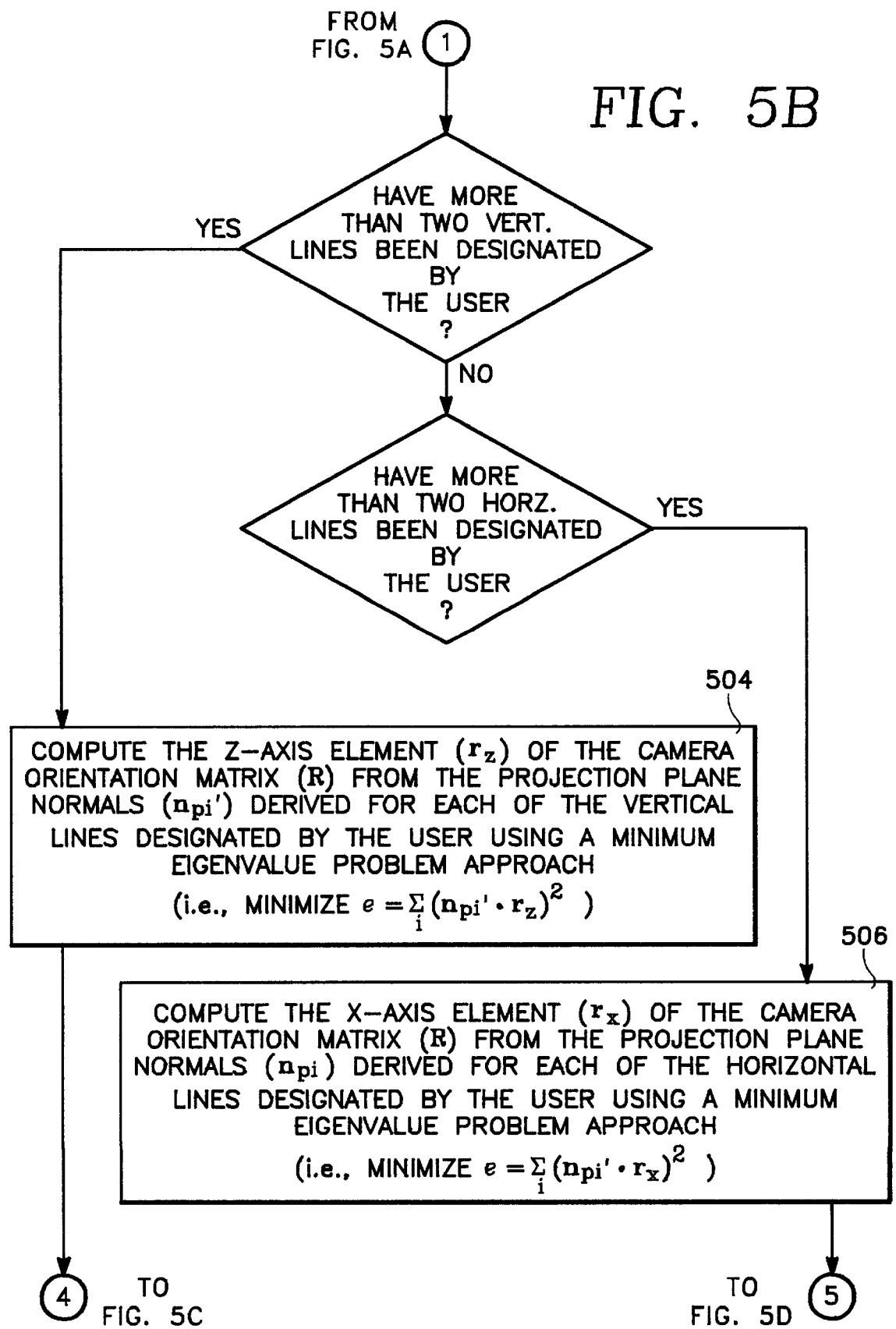
Figure 5C:
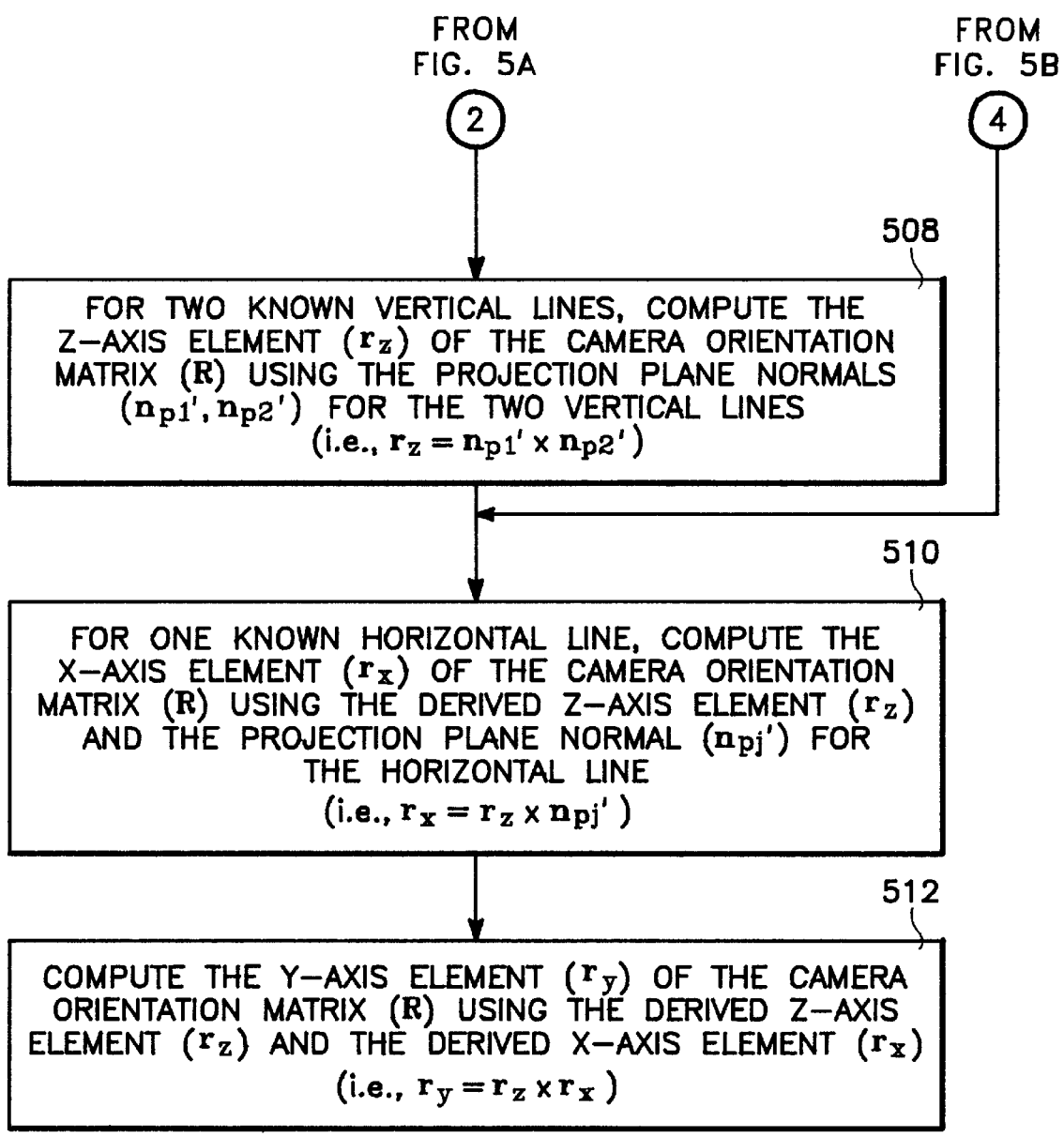
Figure 5D:
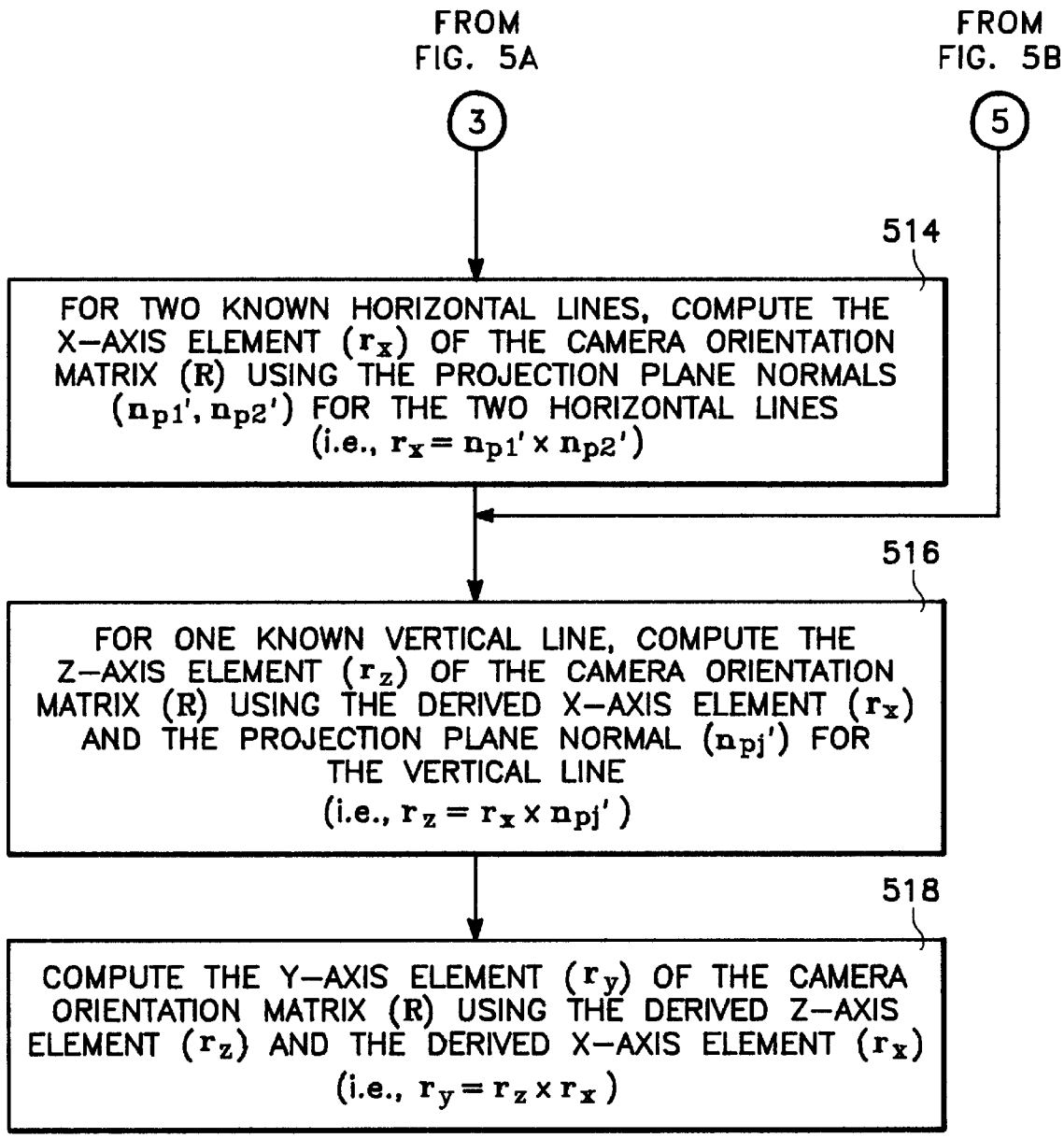

1.3 Determining the Camera Orientation Matrix (R) when More than Two Parallel Lines are Designated in a Set of Parallel Lines In cases where the user designates more than two parallel lines in a set of parallel lines, a modified procedure can be employed to estimate the camera orientation matrix. For example, if the user were to designate three or more lines on a plane in the screen image and identify all as being vertical lines in the 3D scene, the Z-axis element ($r_z$) of the camera orientation matrix can be formulated as a standard minimum eigenvalue problem, i.e., $$e = \sum_i (n_{pi}' \cdot r_z)^2 \tag{2}$$

as shown in step 504 of FIG. 5B. The X-axis and Y-axis elements of the camera orientation matrix are then computed as described previously.

Similarly, if the user designates three or more horizontal lines, the X-axis element of the camera orientation matrix can be formulated as a standard minimum eigenvalue problem using:

$$e = \sum_i (n_{pi}' \cdot r_x)^2 \tag{3}$$

as shown in step 506 of FIG. 5B. Again, the Z-axis and Y-axis elements of the camera orientation matrix are then computed as described previously.

Finally, the line direction recovery step associated with estimating the camera orientation matrix from at least two sets of parallel lines and their associated 3D scene line directions can be formulated as a standard minimum eigenvector problem. Because each "line projection plane" is perpendicular to the line (i.e., $n_{pi}' \cdot m' = 0$), it is desired to minimize:

$$e = \sum_i (n_{pi}' \cdot m')^2 = m^T \left( \sum_i n_{pi}' n_{pi}'^T \right) m' \tag{4}$$

as shown in step 606 of FIG. 6. This is equivalent to finding the vanishing point of the lines [CW90]. It is noted that the parallel lines in a set of lines need not all be on the same plane in the 3D scene. Rather, they could be from more then one plane.

The foregoing error minimization approaches to estimating the camera orientation matrix have significant advantages. First, because the camera orientation matrix computation involves extracting data from potentially noisy panoramic images of a 3D scene, using more lines should provide a better estimate. Another advantage is that the sign ambiguity of $n_{pi}'$ can be ignored in the error minimization formulations.

1.4 Resolving the Sign Ambiguities Associated with the Camera Orientation Matrix Elements ($r_x, r_y, r_z$)

In all the methods for estimating the camera orientation matrix discussed so far, there exists a sign ambiguity resulting from the inherent ambiguity in the direction of the projection plane normals. This ambiguity arises because the user is only required to designate lines in the screen image by specifying two points. These points can be specified in any order, thus the resulting line could have either of two directions. The ambiguity issue is preferably resolved in one of two ways. First, as shown in optional step 404 of FIG. 4A, the user could specify the direction of the designated lines in the panoramic view, thereby preventing the sign ambiguity in the computed projection plane normals. However, this approach is somewhat onerous from the user's perspective as many lines may be specified in modeling a 3D scene in accordance with the present invention. Referring to FIG. 4B, a better approach would be to prompt the user to identify at least two points (e.g. the vertices of a plane) in the screen image and provide their actual 3D scene coordinates (step 412). The 3D coordinates of the designated points are then computed by obtaining their panoramic view coordinates from the screen image and projecting the points into the 3D scene using the previously estimated camera orientation matrix (step 414). The next step 416 of the process is to compare the computed 3D coordinates of the points to the user-specified 3D coordinates. If any of the computed coordinate indices have a different sign from the user-specified coordinates, the sign of the affected camera orientation matrix element is reversed (step 418), thereby resolving any sign ambiguity in the matrix.

2. Estimating Plane Normals

Once the camera orientation matrix has been estimated, the scene geometry (i.e., points, lines, and planes) can be recovered. Because of the bilinear nature of some constraints (such as points on planes), it is possible to compute plane normals (n) before solving for plane distances (d) and points (x). Of course, rather than computing the plane normal of every plane, at least some may be designated by the user. This could be done by the user identifying a plane in the screen image and specifying the direction of the normal of the corresponding plane in the 3D scene. For example, in a preferred scenario the user might specify that the normal of such a plane is directed north, south, up, down, or otherwise. The computer program would interpret these directions and convert them into the 3D coordinate system for further processing. If the user does not designate a normal for a plane in the 3D scene, it can be computed by finding two line directions on the plane.

Figure 7A:
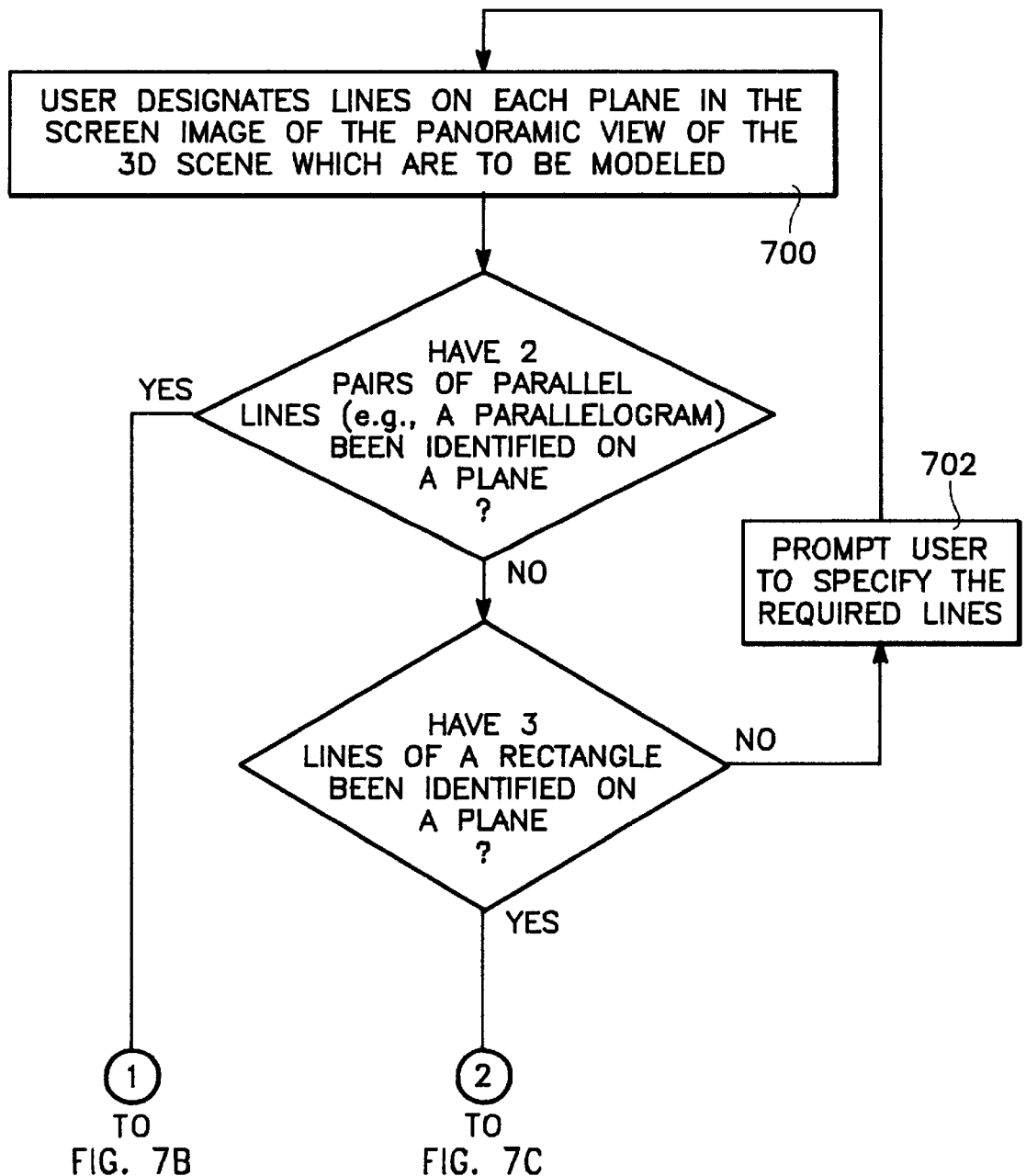
Figure 7B:
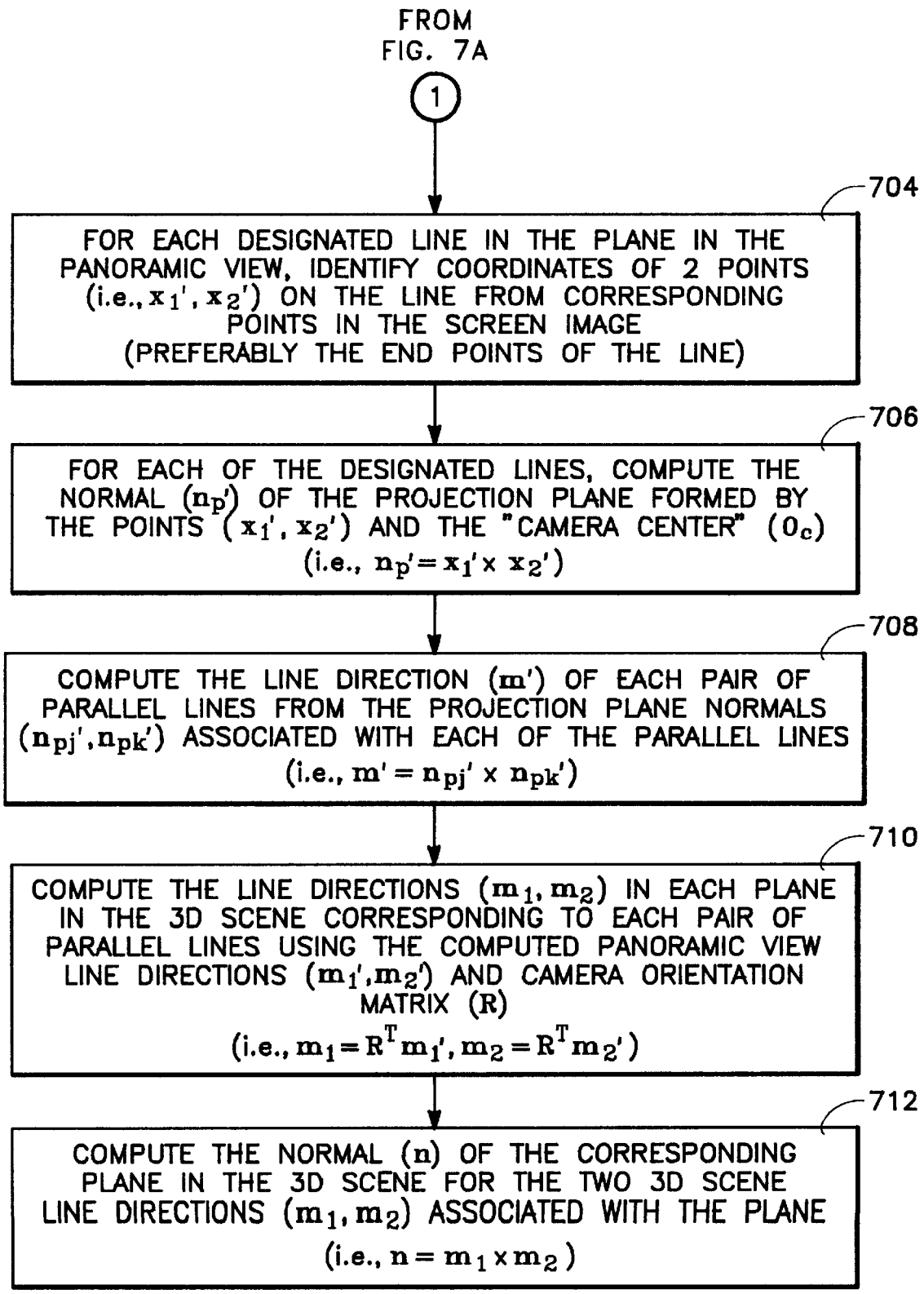

Referring to FIGS. 7A & 7B, the first step 700 in a preferred process for estimating the plane normals involves the user designating lines on each plane in the screen image that is to be modeled. This is accomplished as before with the user specifying two points of the line in the screen image—preferably the end point of the line. Specifically, if the user designates two pairs of parallel lines (e.g., a parallelogram) on a plane in the screen image, the plane normal can be recovered. First, the panoramic view coordinates of the two user-specified points ($x_1'$, $x_2'$) for each designated line are taken from their corresponding screen image coordinates (step 704). Next, the projection plane normal ($n_p'$) of each designated line is computed, i.e., $n_p'=x_1' \times x_2'$ (step 706). From the projection plane normals, the line direction (m') of each pair of the parallel lines on each plane being modeled can be computed, i.e., $m'=n_{pj}' \times n_{pk}'$ (step 708). Using the estimated camera orientation matrix (R) and the computed panoramic view line directions ($m_1'$, $m_2'$) associated respectively with the two pairs of parallel lines designated by the user on planes being modeled, the 3D scene line directions ($m_1$, $m_2$) corresponding to the panoramic view line directions can be computed (step 710) as follows:

$$m_1 = R^T m_1' \text{ and } m_2 = R^T m_2' \tag{5}$$

From the two 3D scene line directions $m_1$ and $m_2$ on each plane, the respective plane normals can be computed as $n = m_1 \times m_2$ (step 712).

Figure 7C:
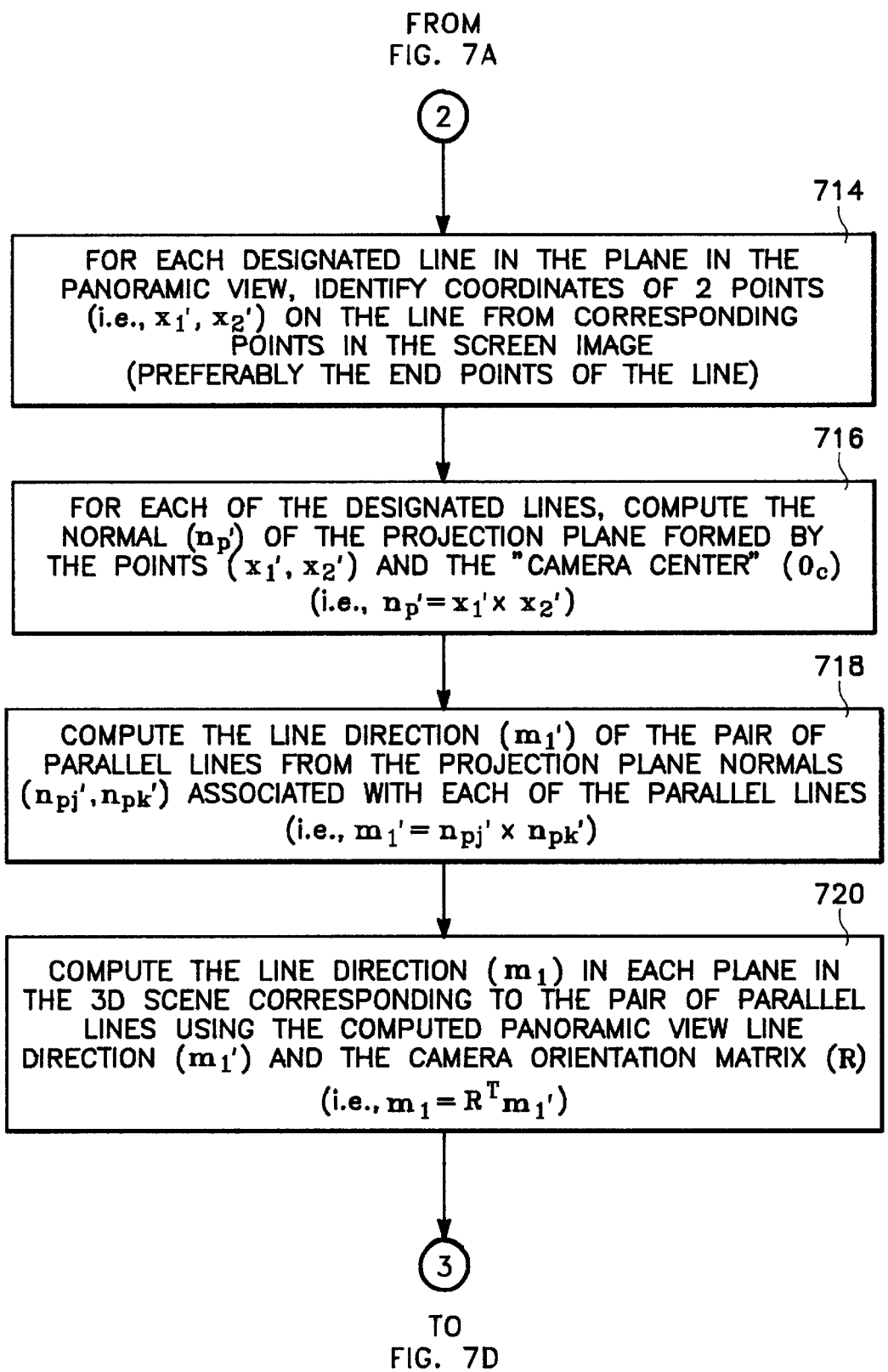

A rectangle is a special case of parallelogram. The plane normal of a 3D scene plane can also be recovered from three lines of the rectangle, as illustrated in FIGS. 7C and 7D. One line direction $m_1$ can be obtained from the two parallel lines designated by the user on a plane in the screen image as part of the aforementioned three lines of the rectangle. As illustrated in steps 714, 716, 718, and 720 of FIG. 7C, this is accomplished in the same way that the line direction ($m_1$) was computed in the previous discussion directed at finding the plane normal using two pairs of parallel lines. In the next step 722 of the process, the line direction ($m_2$) of the line in the 3D scene corresponding to the third (non-parallel) line designated by the user in the screen image of the plane can be found using the other, previously computed line direction ($m_1$) of the plane and the 3D scene projection of the projection plane normal ($n_{p2}'$) associated with the third line in the panoramic view, i.e., $m_2 = m_1 \times n_{p2}$ since $m_1 \cdot m_2 = 0$ and $n_{p2} \cdot m_2 = 0$. The projected normal ($n_{p2}$) is obtained using the camera orientation matrix via the relationship $n_{p2} = R^T n_{p2}'$. As before, the plane normal of the 3D scene plane is computed using $n = m_1 \times m_2$ (step 724).

Using the techniques described above, the surface orientation of an arbitrary plane (e.g., tilted ceiling) can be recovered provided either a parallelogram or rectangle can be "drawn" on the plane in the screen image.

3. Prompting the User to Designate Additional Lines

Up to this point it has been assumed the user has designated a sufficient number of lines on the planes in the screen image to allow both the camera orientation matrix to be determined, and the line directions and plane normals to be derived for each plane that is to be modeled. For example, in the case of estimating the camera orientation matrix, the user must at least designate two vertical lines and one horizontal line associated with the 3D scene (or two horizontal and one vertical) on a plane in the screen image, or at least two sets of parallel lines associated with the 3D scene and their 3D scene directions. Further, in the case of deriving the line directions and plane normals for each plane being modeled, the user must at least designate two sets of parallel lines on each plane in the screen image or alternatively at least three lines of a rectangle. Therefore, it is preferred that the process embodying the present invention include the capability to ascertain if a sufficient number of lines has been specified in accordance with the foregoing minimum requirements, and prompt the user via an appropriate screen image to designate additional lines (step 408 of FIG. 4A and step 702 of FIG. 7A), whenever a sufficient number of lines has not been supplied.

4. Recovering Camera Translation

A point on a 2D model (panorama) represents a ray from the camera origin through the pixel on the image. This constraint can be expressed in different ways. For example, each point in 3D model can be related to its 2D counterpart by a scale k, i.e., $$(x-t) = k R^T x' \tag{6}$$

Figure 8:
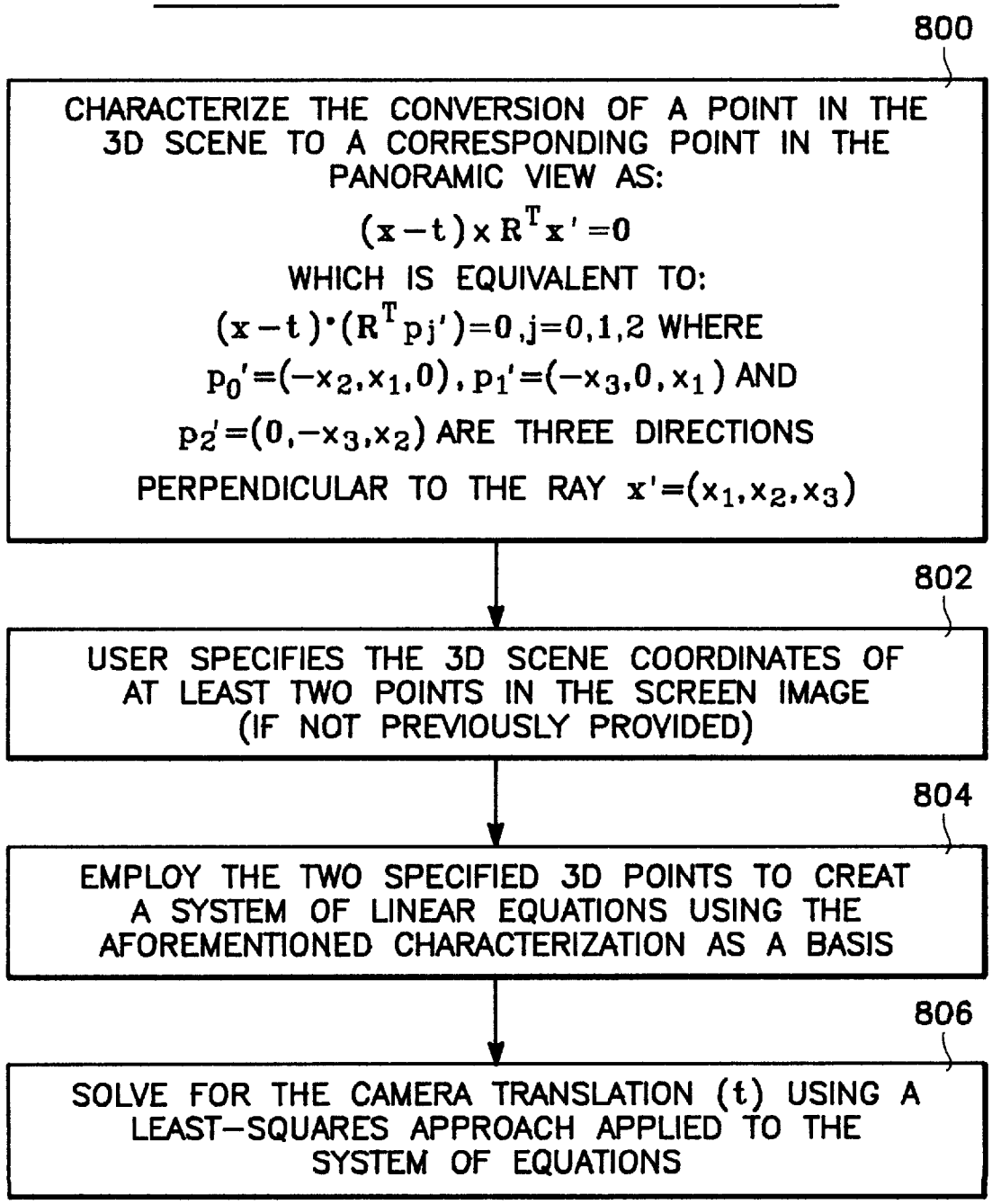
FIG. 8 is a block diagram of a process for accomplishing the camera translation recovery program module of the overall process of FIG. 3.

Alternatively, the 3D point should lie on the ray represented by the 2D point. Therefore, referring to step 800 of FIG. 8, the conversion of the 3D scene coordinates of a point in the 3D scene to the panoramic view coordinates of a corresponding point in the panoramic view can be characterized by:

$$(x-t) \times R^T x' = 0 \tag{7}$$

which is equivalent to $$(x-t) \cdot (R^T p_j') = 0, j=0,1,2 \tag{8}$$

where $p_0' = (-x_2, x_1, 0)$, $p_1' = (-x_3, 0, x_1)$ and $p_2' = (0, -x_3, x_2)$ are three directions perpendicular to the ray $x' = (x_1, x_2, x_3)$. Note that only two of the three constraints are linearly independent. The third constraint with minimum $\|p_i'\|^2$ can be eliminated. Thus, camera translation t can be recovered as a linear least-squares problem if the user specifies the corresponding 3D scene coordinates of two or more points in the screen image (step 802). This is accomplished by employing the specified 3D point coordinates to create a system of linear equations using the aforementioned conversion characterization (step 804). The camera translation (t) is then found by using a conventional least squares approach applied to the system of equations (step 806). In practice, it is convenient to fix a few points, including the 3D model origin (0, 0, 0). These same points can also be used to eliminate the ambiguities in recovering camera orientation matrix as previously described.

For a single panorama, the camera translation (t) is set to zero if no point in 3D model is given. This implies that the camera coordinate coincides with the 3D model coordinate. It should be pointed out that it is not necessary to recover camera translation independently. Rather, the camera translation can be solved for along with plane distances and points as shown in the next section.

5. Estimating the 3D Model 5.1 Creating a Linear System of Constraint Equations

The model of the 3D scene constructed in accordance with the present invention consists of one or more subsystems (connected components) each represented by a set of connected planes. Each of these sets of connected planes is characterized using a linear system of geometric constraint equations and solved independently. For example, when modeling a room with an object, such as a computer monitor, floating in space and not connected with any wall, the ceiling or floor of the room, the 3D scene consists of two subsystems, i.e. the room itself and the computer monitor. As such the room would be characterized by a system of linear constraint equations and the computer monitor would be characterized by a separate system of linear constraint equations. Each system of equations would then be solved independently and the resulting 3D models combined to model the entire 3D scene.

Referring to FIG. 9A, each subsystem to be modeled in the 3D scene is characterized by a linear system of geometric constraint equations as follows. Preferably, the user designates 3D scene parameters such as known point locations (x"), plane normals (n"), line directions (m"), or plane distances (d"), as well as other geometric relationships including a designation that two planes are parallel to each other (step 900) in the 3D scene (e.g. opposite walls of a square room). The previously computed 3D plane normals (n) and line directions (m) of each plane in a subsystem are then used to form the linear system of constraint equations for that subsystem, along with the aforementioned user-designated 3D scene parameters (step 902).

Table 1 lists the geometric constraint equations used in a preferred modeling system embodying the present invention. It is noted that here again that the notations x", n", m", and d" are the used to represent user-specified parameters associated with planes of the 3D scene. In addition, the third column designator "n" of Table 1 refers to the number of constrains associated with the equation.

TABLE 1

| Type | Constraint | n |
|---|---|---|
| Known point | $x_i'$ | 3 |
| Known plane | $d_i'$ | 1 |
| Distance ∥ planes | $d_i - d_j$ | 1 |
| Point/model | $(x - t) \cdot p_j = 0$ | 2 |
| Point/plane | $x_i \cdot n_k + d_k = 0$ or | 1 |
|  | $x_i \cdot n_k + d_k \; 0$ | 1 |
| Points/line | $(x_i - x_j) \times m' = 0$ or | 2 |
|  | $(x_i - x_j) \times m = 0$ | 2 |
| Known length | $x_i - x_j = cm'$ or | 3 |
|  | $x_i - x_j = cm$ | 3 |

5.2 Solving the System of Linear Constraint Equations

Figure 9B:
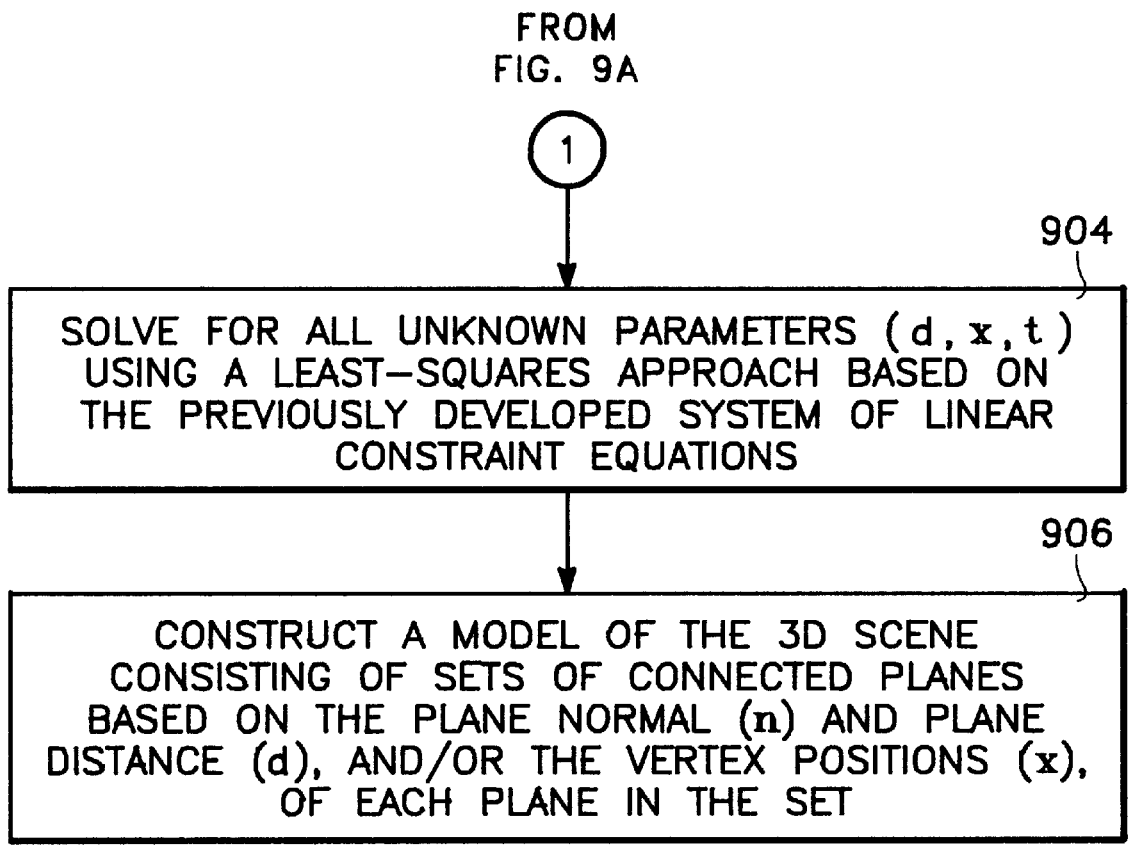

Referring to FIG. 9B, the system of linear geometric constraint equations is solved using a least squares approach to estimate all the unknown parameters associated with the planes in the subsystem, i.e. the plane distances (d) and 3D vertex point locations (x) of each plane, as well as the camera translation (t) if it has not been previously recovered (step 904). The model of the 3D scene can then be constructed using the previously estimated and user-designated plane normals (n) and plane distances (d), and/or the 3D vertex point locations (x), of each plane in each subsystem in the scene (step 906).

6. Experiments

Figure 10A:
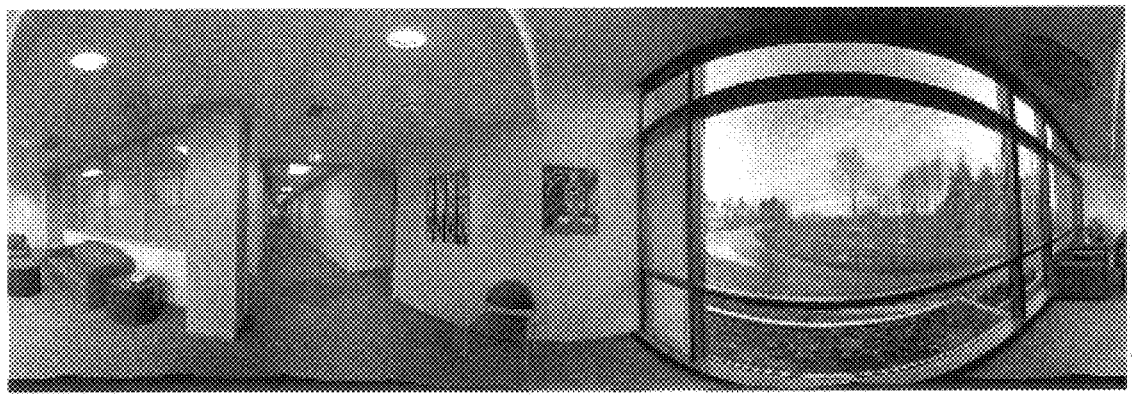
FIG. 10A is an image depicting a spherical panoramic view of a building interior.
Figure 10B:
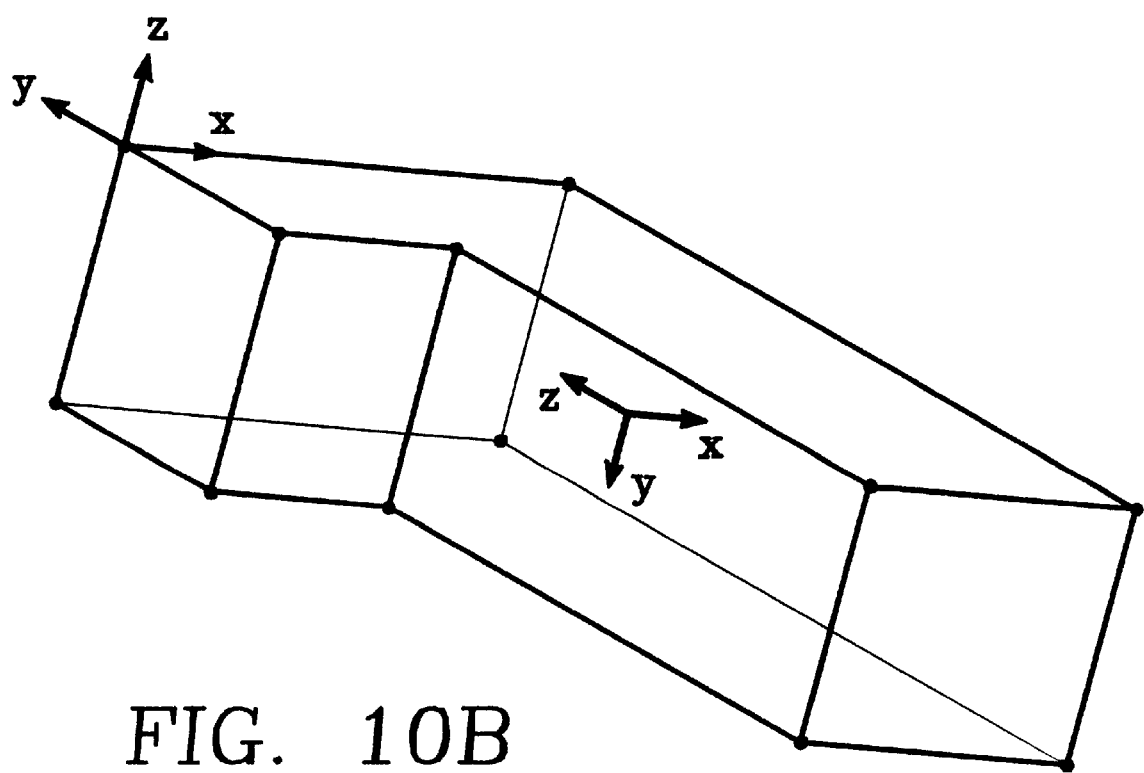
FIG. 10B is a diagram graphically depicting a simple reconstructed model of the 3D scene associated with the panoramic image of FIG. 10A, produced using a modeling system embodying the present invention.

We have implemented and tested our system on a PC, such as the one described in connection with FIG. 1. For example, FIG. 10A shows a spherical panoramic view of a building interior (i.e. the 3D scene) and FIG. 10B shows a simple reconstructed 3D model produced from the panoramic view using a modeling system embodying the present invention. The coordinate system on the left corner in FIG. 10B is the world coordinate, and the coordinate system in the middle is the panoramic view coordinate. The panoramic view of FIG. 10A is composed of 60 images that have been combined using a known method of creating full-view panoramas [SS97a] from individual images of a scene.

Figure 11A:
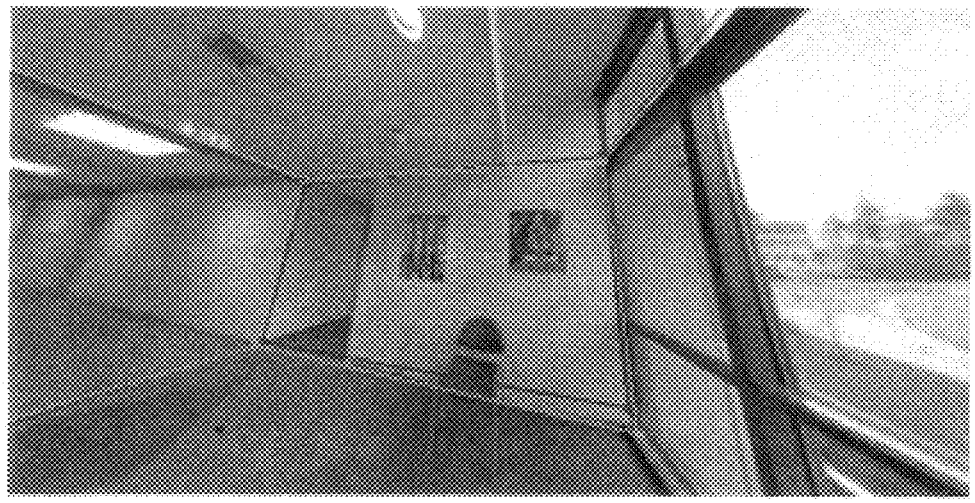
FIGS. 11A & 11B are images depicting zoomed and panned screen images of the interior scene shown in the panoramic view of FIG. 10A.
Figure 11B:
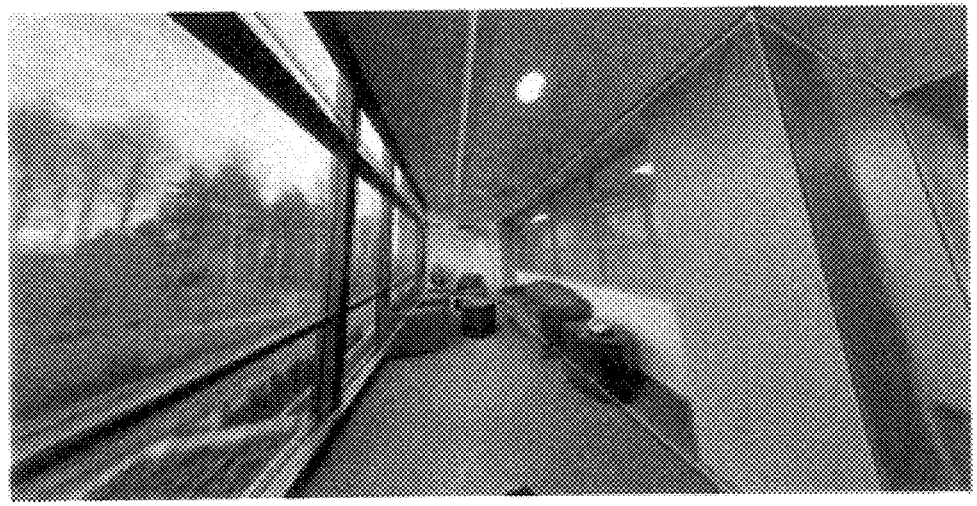

FIGS. 11A and 11B represent two zoomed and panned screen images of the interior scene shown in the panoramic view of FIG. 10A. Green lines and points are a sampling of the 2D panoramic view items that are manually "drawn" by the user on the screen image and assigned with 3D scene properties (e.g., 3D scene line directions and point coordinates), as described previously. The blue lines and points are projections of the recovered 3D model. It was found that this interactive, user interface was easy to use. For example, it took only about 15 minutes to build the simple model in FIG. 10B.

As can be seen from FIGS. 10A, 10B, 11A and 11B, the present invention utilizes a user interface environment including screen images of a panoramic view of a 3D scene. The interface allows the user to select portions of the panoramic view to be displayed as the screen image (such as was done in FIGS. 11A and 11B). Essentially, the user can input commands to pan to a particular portion of the panoramic view, tilt the image vertically to view just a portion thereof, and zoom in or out on a portion of the view. In addition, the interface allows a user to employ a pointing method (such as a mouse, touch sensitive screen, etc.), in a conventional manner to identify features, such as lines and points, on the screen image. For example, as discussed previously, the user designates a line by identifying two points of the line on the screen image. A line then appears (e.g., the green lines shown in FIGS. 11A and 11B) on the screen image between the two specified points. A point can be depicted in much the same way. The user identifies a point on the screen image and a dot appears at that location. In addition, the user would preferably assign properties to identified features by making selections on, or entering information via a keyboard, etc. into, a conventional graphical screen image (not shown), similar to those currently used by commercially available graphic user interfaces such as Microsoft Windows™. For example, the user would preferably enter 3D scene line directions and point coordinates via this method.

In regard to the process of the user designating lines on the screen image, it is noted that a line snapping technique can be employed in an attempt to increase the accuracy of the positioning of lines on the screen image. In a typical line snapping technique, the user would first specify the two points of the line (preferably the end points) and a line would be "drawn" on the screen image between the points, as discussed above. In cases where the line coincides with a readily definable feature of the 3D scene (such as a window frame, corner of room or building, or the like), conventional edge detection methods would be employed to fit (i.e., "snap") the line to the edge. This may result in the shifting of the user-identified points to new locations on the screen image. These new point locations would be used in the previously described computation steps rather than the user-specified point locations, thereby potentially resulting in a more user-friendly and accurate modeling of the 3D scene.

REFERENCES

[BB95] S. Becker and V. M. Bove. Semiautomatic 3-D model extraction from uncalibrated 2-D camera views. In *SPIE Vol. 2410, Visual Data Exploration II*, pages 447–461, February 1995.

[BR97] S. Bougnoux and L. Robert. Totalcalib: a fast and reliable system for off-line calibration of image sequences. In *CVPR'97*, June 1997. The Demo Session.

[CW90] R. T. Collins and R. S. Weiss. Vanish point calculation as a statistical inference on the unit sphere. In *ICCV'90*, pages 400–403, December 1990.

[FSL+95] O. D. Faugeras, Laveau S., Robert L., Csurka G., and Zeller C. 3-D reconstruction of urban scenes from sequences of images. Technical Report 2572, INRIA, 1995.

[GV96] G. Golub and C. F. Van Loan. *Matrix Computation*, third edition. The John Hopkins University Press, 1996.

[Har89] R. M. Haralick. Determining camera parameters from the perspective projection of a rectangle. *Pattern Recognition*, 22(3):225–230, 1989.

[KS96] S. B. Kang and R. Szeliski. 3-D scene data recovery using omnidirectional multibaseline stereo. In *CVPR'96*, pages 364–370, June 1996.

[KW97] S. B. Kang and R Weiss. Characterization of errors in compositing panoramic images. In *CVPR'97*, pages 103–109, June 1997.

[MB95] L. McMillan and G. Bishop. Plenoptic modeling: An image-based rendering system. *SIGGRAPH'95*, pages 39–46, August 1995.

[SK97] H. S. Sawhney and R. Kumar. True multi-image alignment and its application to mosaicing and lens distortion correction. In *CVPR'97*, pages 450–456, June 1997.

[SS97a] H.-Y. Shum and R. Szeliski. Construction and refinement of panoramic mosaics with global and local alignment. In *ICCV'98*, pages 953–958, 1998.

[SS97b] R. Szeliski and H. Y. Shum. Creating full view panoramic image mosaics and texture-mapped models. *SIGGRAPH'95*, pages 251–258, August 1997.

[Ste95] G. Stein. Accurate internal camera calibration using rotation, with analysis of sources of error. In *ICCV95*, pages 230–236, June 1995.

[TDM96] C. J. Taylor, P. E. Debevec, and J. Malik. Reconstructing polyhedral models of architectural scenes from photographs. In *ECCV'96*, volume 2, pages 659–668, April 1996.

[WH88] E. L. Walker and M. Herman. Geometric reasoning for constructing 3D scene descriptions from images. *Artificial Intelligence*, 37:275–290, 1988.

What is claimed is:

1. A computer-implemented process to construct a model of a 3D scene from a panoramic view of the scene, comprising using a computer to perform the following steps:

displaying an image of the panoramic view of the 3D scene as a screen image;

recovering a camera orientation matrix of the panoramic view based on lines associated with at least one plane of the 3D scene as specified by a user of the computer-implemented process;

estimating plane normals and line directions for planes in the 3D scene which are to be modeled using the camera orientation matrix;

recovering a camera translation using the camera orientation matrix, wherein the camera translation is the difference between the camera projection center and the coordinate origin of the 3D scene;

estimating unknown plane distances and vertex point locations for each plane in the 3D scene which is to be modeled using the estimated plane normals and line directions;

constructing a model of the 3D scene consisting of at least one set of connected planes based on the plane normal and plane distance, and/or the vertex point locations, of each plane in the set.

2. The process of claim 1, wherein the camera orientation matrix recovery step comprises the steps of:

the user designating lines on at least one plane in the screen image of the panoramic view of the 3D scene;

the user identifying the direction of lines in the 3D scene which correspond to each of the designated lines in the screen image; and determining the camera orientation matrix using the designated lines and identified line directions.

3. The process of claim 2, wherein the camera orientation matrix recovery step further comprises the steps of:

ascertaining whether the user has designated a sufficient number of lines on the at least one plane to determine the camera orientation matrix; and prompting the user to designate additional lines on the at least one plane whenever it is ascertained there are not a sufficient number to determine the camera orientation matrix.

4. The process of claim 3, wherein the ascertaining step comprises ascertaining whether the user has designated one of (i) lines on a plane corresponding to at least two vertical lines and one horizontal line of the 3D scene, (ii) lines on a plane corresponding to at least two horizontal lines and one vertical line of the 3D scene, or (iii) lines on planes corresponding to at least two sets of parallel lines of the 3D scene and the direction of each set of parallel lines in the 3D scene.

5. The process of claim 2, wherein the determining step comprises the step of deriving the camera orientation matrix from lines on a plane corresponding to at least two vertical lines and one horizontal line of the 3D scene, as designated by the user.

6. The process of claim 5, wherein the deriving step comprises the steps of:

identifying the coordinates of two points on each line in the panoramic view that corresponds to the at least two vertical lines and one horizontal line designated by the user in the screen image;

computing a normal for each of the projection planes associated with said lines in the panoramic view, each projection plane being defined by the two identified points and a camera center associated with the panoramic view;

computing a Z-axis element of the camera orientation matrix using the computed projection plane normals associated with each of the designated vertical lines;

computing an X-axis element of the camera orientation matrix using the computed Z-axis element and the projection plane normal associated with the designated horizontal line; and computing a Y-axis element of the camera orientation matrix using the computed Z-axis and X-axis elements.

7. The process of claim 6, wherein the user designated more than two vertical lines on the plane, and wherein the step of computing the Z-axis element of the camera orientation matrix comprises using a minimum eigenvalue problem approach.

8. The process of claim 6, wherein the coordinates of the two points identified on each line in the panoramic view correspond to the coordinates of the two end points of each line.

9. The process of claim 2, wherein the determining step comprises the step of deriving the camera orientation matrix from lines on a plane corresponding to at least two horizontal lines and one vertical line of the 3D scene, as designated by the user.

10. The process of claim 9, wherein the deriving step comprises the steps of:

identifying the coordinates of two points on each line in the panoramic view that corresponds to the at least two horizontal lines and one vertical line designated by the user in the screen image;

computing a normal for each of the projection planes associated with said lines in the panoramic view, each projection plane being defined by the two identified points and a camera center associated with the panoramic view;

computing an X-axis element of the camera orientation matrix using the computed projection plane normals associated with each of the designated horizontal lines;

computing a Z-axis element of the camera orientation matrix using the computed X-axis element and the projection plane normal associated with the designated vertical line; and computing a Y-axis element of the camera orientation matrix using the computed X-axis and Z-axis elements.

11. The process of claim 10, wherein the user designated more than two horizontal lines on the plane, and wherein the step of computing the X-axis element of the camera orientation matrix comprises using a minimum eigenvalue problem approach.

12. The process of claim 10, wherein the coordinates of the two points identified on each line in the panoramic view correspond to the coordinates of the two end points of each line.

13. The process of claim 2, wherein the determining step comprises the step of deriving the camera orientation matrix from at least two sets of parallel lines on one or more planes and the direction of each of the parallel lines in the 3D scene, as designated by the user.

14. The process of claim 13, wherein the deriving step comprises the steps of:

identifying the coordinates of two points on each line in the panoramic view that corresponds to the at least two sets of parallel lines designated by the user in the screen image;

computing a normal for each of the projection planes associated with said lines in the panoramic view, each projection plane being defined by the two identified points and a camera center associated with the panoramic view;

computing a line direction for each set of parallel lines in the panoramic view using the computed projection plane normals associated with that set of parallel lines;

computing the camera orientation matrix from the computed panoramic view line direction for each set of parallel lines and the line direction of each corresponding set of parallel lines in the 3D scene as designated by the user using a maximum eigenvalue problem approach.

15. The process of claim 14, wherein the user designated more than two parallel lines in a set of parallel lines, and wherein the step of computing a line direction for each set of parallel lines in the panoramic view comprises using a minimum eigenvector problem approach.

16. The process of claim 14, wherein the coordinates of the two points identified on each line in the panoramic view correspond to the coordinates of the two end points of each line.

17. The process of claim 2 wherein an element of the determined camera orientation matrix may be reversed in sign in comparison to the actual camera orientation matrix, and wherein the camera orientation matrix recovery step further comprises the step of resolving any sign ambiguity existing in the determined camera orientation matrix.

18. The process of claim 17 wherein the resolving step comprises the user specifying the direction of each previously designated line associated with a plane as it appears in the panoramic view of the scene.

19. The process of claim 17 wherein the resolving step comprises the steps of:

the user specifying the 3D scene coordinates of at least two points identified by the user in the screen image;

computing the 3D scene coordinates of the points identified by the user in the screen image by projecting the panoramic view coordinates of these points obtained from the screen image to the 3D scene using the camera orientation matrix;

comparing the computed 3D scene coordinates with the coordinates specified by the user; and reversing the sign of any of the determined camera orientation matrix elements corresponding to a computed 3D scene coordinate element that has a different sign than the corresponding 3D scene coordinate element specified by the user.

20. The process of claim 1, wherein the step of estimating plane normals and line directions for planes in the 3D scene comprises the steps of:

the user designating lines on each plane in the screen image of the panoramic view which is to be modeled;

deriving the direction of lines in the 3D scene corresponding to each of the user designated lines in the screen image using the camera orientation matrix; and deriving a normal for each plane in the 3D scene that corresponds to a plane of the screen image on which the user has designated lines, using the derived 3D scene line directions associated with that plane.

21. The process of claim 20, wherein the step of estimating plane normals and line directions for planes in the 3D scene further comprises the steps of:

ascertaining whether the user has designated a sufficient number of lines on the at least one plane in the screen image to derive the line directions and plane normal associated with the corresponding plane in the 3D scene; and prompting the user to designate additional lines on the at least one plane in the screen image whenever it is ascertained there are not a sufficient number to derive the line directions and plane normal associated with the corresponding plane in the 3D scene.

22. The process of claim 21, wherein the ascertaining step comprises ascertaining whether the user has designated one of (i) at least two sets of parallel lines on the plane, or (ii) at least three lines of a rectangle on the plane.

23. The process of claim 20, wherein the step of deriving the direction of lines in the 3D scene corresponding to each of the user designated lines in the screen image comprises deriving the direction of lines on planes to be modeled in the 3D scene using two pairs of parallel lines designated by the user as being on the corresponding plane in the screen image.

24. The process of claim 23, wherein the step of deriving the direction of lines on planes to be modeled in the 3D scene comprises the steps of:

identifying the coordinates of two points on each line in the panoramic view that corresponds to the two pairs of parallel lines designated by the user in the screen image;

computing a normal for each of the projection planes associated with the two pairs of parallel lines in the panoramic view, each projection plane being defined by the two identified points and a camera center associated with the panoramic view;

computing a line direction for each pair of parallel lines in the panoramic view using the computed projection plane normals associated with that pair of parallel lines; and computing the line direction in each plane in the 3D scene corresponding to each pair of parallel lines in the panoramic view using the computed panoramic view line directions and the camera orientation matrix.

25. The process of claim 24, wherein the coordinates of the two points identified on each line in the panoramic view correspond to the coordinates of the two end points of each line.

26. The process of claim 20, wherein the step of deriving the direction of lines in the 3D scene corresponding to each of the user designated lines in the screen image comprises deriving the direction of lines on planes to be modeled in the 3D scene using three lines of a rectangle designated by the user as being on the corresponding plane in the screen image.

27. The process of claim 26, wherein the step of deriving the direction of lines on planes to be modeled in the 3D scene comprises the steps of:
  identifying the coordinates of two points on each line in the panoramic view that corresponds to the three lines of the rectangle designated by the user in the screen image;
  computing a normal for each of the projection planes associated with the three lines of the rectangle in the panoramic view, each projection plane being defined by the two identified points and a camera center associated with the panoramic view;
  computing a line direction for two lines of the three lines of the rectangle in the panoramic view that are parallel using the computed projection plane normals associated with the pair of parallel lines; and
  computing the line direction in each plane in the 3D scene corresponding to the pair of parallel lines in the panoramic view using the computed panoramic view line direction and the camera orientation matrix;
  computing a 3D scene projection of the projection plane normal associated with the remaining, non-parallel line of the three lines of the rectangle using the camera orientation matrix;
  computing a line direction for a line in the 3D scene corresponding to the remaining, non-parallel line of the three lines of the rectangle in the panoramic view using the previously computed line direction of the pair of parallel lines in the 3D scene and the previously computed 3D scene projection of the projection plane normal associated with the remaining, non-parallel line.

28. The process of claim 27, wherein the coordinates of the two points identified on each line in the panoramic view correspond to the coordinates of the two end points of each line.

29. The process of claim 1, wherein the step of recovering the camera translation comprises the steps of:
  the user specifying the 3D scene coordinates of at least two points identified by the user in the screen image;
  characterizing the conversion of a point in the 3D scene to a corresponding point in the panoramic view using the relationship,
  $(x-t) \times R^T x' = 0$, which is equivalent to,
  $(x-t) \cdot (R^T p_j') = 0$, $j=0,1,2$ where
x represents the coordinates of a point in the 3D scene, t represents the camera translation, R represents the camera orientation matrix, x' represents the coordinates of a point in the panoramic view which corresponds to a point x in the 3D scene and $p_0'=(-x_2, x_1, 0)$, $p_1'=(-x_3, 0, x_1)$ and $p_2'=(0, -x_3, x_2)$ represent three directions perpendicular to a ray from the camera center through the point $x'=(x_1, x_2, x_3)$;

creating a system of linear equation based on the characterizing relationship using the at least two user specified points; and
estimating the camera translation from the system of linear equations using a least-squares approach.

30. The process of claim 1, wherein the step of estimating plane distances and vertex point locations for each plane in the 3D scene which is to be modeled comprises the steps of:
  the user designating ones of,
    3D scene coordinates of points corresponding to points identified by the user in the screen image,
    plane normals associated with planes in the 3D scene that correspond to planes identified by the user in the screen image,
    directions of lines in the 3D scene that correspond to lines identified by the user in the screen image,
    plane distances associated with planes in the 3D scene that correspond to planes identified by the user in the screen image, and
    planes in the screen image that correspond to parallel planes of the 3D scene;
  characterizing the 3D scene as at least one set of connected planes, each set being subject to a series of geometric constraints;
  creating a system of linear geometric constraint equations based on the characterizing constraints for each set of connected planes in the 3D scene which are to be modeled; and
  estimating the unknown plane distances and vertex points for each set of connected planes in the 3D scene which is to be modeled from the system of equations using a least-squares approach.

31. The process of claim 30, wherein the system of constraints employed in the characterizing step comprises:

| | |
|---|---|
| Known point | $x_i''$, |
| Known plane Distance | $d_i''$, |
| Parallel planes | $d_i - d_j = \text{Const.}$, |
| Point/model | $(x - t) \cdot p_j = 0$, |
| Point/plane | $x_i \cdot n_k'' + d_k = 0$, |
| Point/plane | $x_i \cdot n_k + d_k = 0$, |
| Points/line | $(x_i - x_j) \times m'' = 0$, |
| Points/line | $(x_i - x_j) \times m = 0$, |
| Known length | $x_i - x_j = \text{cm}''$, |
| Known length | $x_i - x_j = \text{cm}$ | where x" represents the coordinates of a point in the 3D scene designated by the user and x represents the unknown coordinates of a point in the 3D scene, d" represents a distance from the origin of the 3D scene to a plane in the scene as designated by the user and d represents an unknown distance from the origin of the 3D scene to a plane in the scene, t represents the camera translation, $p_j$ represents $p_0=(-x_2, x_1, 0)$, $p_1=(-x_3, 0, x_1)$ and $p_2=(0, -x_3, x_2)$ which correspond to three directions perpendicular to a ray from the camera center through the point $x=(x_1, x_2, x_3)$, n" represents a normal of a plane in the 3D scene designated by the user and n represents the estimated normal of a plane in the 3D scene, m" represents a direction of a line in the 3D scene designated by the user and m represents the estimated direction of a line in the 3D scene, and c represents a scaling factor.

32. The process of claim 31, wherein the creating step comprises using the user designated points, plane normals, line directions, plane distances and parallel planes, as well as the estimated plane normals and line directions to create the system of equations.

33. The process of claim 32 wherein the camera translation has been previously estimated and the creating step further comprises using the estimated camera translation to create the system of equations.

34. The process of claim 32, wherein the camera translation is unknown and estimated along with the unknown plane distances and vertex point locations from the system of equations using the least-squares approach.

35. A system for constructing a model of a 3D scene from a panoramic view of the scene, comprising:
  a general purpose computing device; and
  a computer program comprising program modules executable by the computing device, wherein the computing device is directed by the program modules of the computer program to,
    display an image of the panoramic view of the 3D scene on a computer monitor screen,
    recover a camera orientation matrix of the panoramic view based on lines associated with at least one plane of the 3D scene as specified by a user of the computing device,
    estimate plane normals and line directions for planes in the 3D scene which are to be modeled using the camera orientation matrix,
    recover a camera translation using the camera orientation matrix, wherein the camera translation is the difference between the camera projection center and the coordinate origin of the 3D scene,
    estimate unknown plane distances and vertex point locations for each plane in the 3D scene which is to be modeled using the estimated plane normals and line directions,
    construct a model of the 3D scene consisting of at least one set of connected planes based on the plane normal and plane distance, and/or the vertex point locations, of each plane in the set.

36. The system of claim 35, wherein the user designates lines on at least one plane in the screen image of the panoramic view of the 3D scene and identifies the direction of lines in the 3D scene which correspond to each of the designated lines in the screen image, and wherein the program module for recovering the camera orientation matrix comprises a sub-module for determining the camera orientation matrix using the designated lines and identified line directions.

37. The system of claim 36, wherein the program module for recovering the camera orientation matrix further comprises sub-modules for:
  ascertaining whether the user has designated a sufficient number of lines on the at least one plane to determine the camera orientation matrix; and
  prompting the user to designate additional lines on the at least one plane whenever it is ascertained there are not a sufficient number to determine the camera orientation matrix.

38. The system of claim 37, wherein the ascertaining sub-module comprises a sub-module for ascertaining whether the user has designated one of (i) lines on a plane corresponding to at least two vertical lines and one horizontal line of the 3D scene, (ii) lines on a plane corresponding to at least two horizontal lines and one vertical line of the 3D scene, or (iii) lines on planes corresponding to at least two sets of parallel lines of the 3D scene and the direction of each set of parallel lines in the 3D scene.

39. The system of claim 36, wherein the determining sub-module comprises a sub-module for deriving the camera orientation matrix from lines on a plane corresponding to at least two vertical lines and one horizontal line of the 3D scene, as designated by the user.

40. The system of claim 39, wherein the deriving sub-module comprises sub-modules for:
  identifying the coordinates of two points on each line in the panoramic view that corresponds to the at least two vertical lines and one horizontal line designated by the user in the screen image;
  computing a normal for each of the projection planes associated with said lines in the panoramic view, each projection plane being defined by the two identified points and a camera center associated with the panoramic view;
  computing a Z-axis element of the camera orientation matrix using the computed projection plane normals associated with each of the designated vertical lines;
  computing an X-axis element of the camera orientation matrix using the computed Z-axis element and the projection plane normal associated with the designated horizontal line; and
  computing a Y-axis element of the camera orientation matrix using the computed Z-axis and X-axis elements.

41. The system of claim 40, wherein the user designated more than two vertical lines on the plane, and wherein the sub-module for computing the Z-axis element of the camera orientation matrix comprises a sub-module for using a minimum eigenvalue problem approach to compute the Z-axis element.

42. The system of claim 40, wherein the coordinates of the two points identified on each line in the panoramic view correspond to the coordinates of the two end points of each line.

43. The system of claim 36, wherein the determining sub-module comprises a sub-module for deriving the camera orientation matrix from lines a plane corresponding to at least two horizontal lines and one vertical line of the 3D scene, as designated by the user.

44. The system of claim 43, wherein the deriving sub-module comprises sub-modules for:
  identifying the coordinates of two points on each line in the panoramic view that corresponds to the at least two horizontal lines and one vertical line designated by the user in the screen image;
  computing a normal for each of the projection planes associated with said lines in the panoramic view, each projection plane being defined by the two identified points and a camera center associated with the panoramic view;
  computing an X-axis element of the camera orientation matrix using the computed projection plane normals associated with each of the designated horizontal lines;
  computing a Z-axis element of the camera orientation matrix using the computed X-axis element and the projection plane normal associated with the designated vertical line; and
  computing a Y-axis element of the camera orientation matrix using the computed X-axis and Z-axis elements.

45. The system of claim 48, wherein the user designated more than two horizontal lines on the plane, and wherein the sub-module for computing the X-axis element of the camera orientation matrix comprises a sub-module for using a minimum eigenvalue problem approach to compute the X-axis element.

46. The system of claim 44, wherein the coordinates of the two points identified on each line in the panoramic view correspond to the coordinates of the two end points of each line.

47. The system of claim 36, wherein the determining sub-module comprises a sub-module for deriving the camera orientation matrix from at least two sets of parallel lines on one or more planes and the direction of each of the parallel lines in the 3D scene, as designated by the user.

48. The system of claim 47, wherein the deriving sub-module comprises sub-modules for:
 identifying the coordinates of two points on each line in the panoramic view that corresponds to the at least two sets of parallel lines designated by the user in the screen image;
 computing a normal for each of the projection planes associated with said lines in the panoramic view, each projection plane being defined by the two identified points and a camera center associated with the panoramic view;
 computing a line direction for each set of parallel lines in the panoramic view using the computed projection plane normals associated with that set of parallel lines;
 computing the camera orientation matrix from the computed panoramic view line direction for each set of parallel lines and the line direction of each corresponding set of parallel lines in the 3D scene as designated by the user using a maximum eigenvalue problem approach.

49. The system of claim 48, wherein the user designated more than two parallel lines in a set of parallel lines, and wherein the sub-module for computing a line direction for each set of parallel lines in the panoramic view comprises a sub-module for using a minimum eigenvector problem approach to compute the line direction for each set of parallel lines.

50. The system of claim 48, wherein the coordinates of the two points identified on each line in the panoramic view correspond to the coordinates of the two end points of each line.

51. The system of claim 36 wherein an element of the determined camera orientation matrix may be reversed in sign in comparison to the actual camera orientation matrix, and wherein the camera orientation matrix recovery sub-module further comprises a sub-module for resolving any sign ambiguity existing in the determined camera orientation matrix.

52. The system of claim 51, wherein the user specifies the direction of each previously designated line associated with a plane of the 3D scene as it appears in the panoramic view of the scene.

53. The system of claim 51, wherein the user specifies the 3D scene coordinates of at least two points identified by the user in the screen image and the resolving sub-module comprises a sub-modules for:
 computing the 3D scene coordinates of the points identified by the user in the screen image by projecting the panoramic view coordinates of these points obtained from the screen image to the 3D scene using the camera orientation matrix;
 comparing the computed 3D scene coordinates with the coordinates specified by the user; and
 reversing the sign of any of the determined camera orientation matrix elements corresponding to a computed 3D scene coordinate element that has a different sign than the corresponding 3D scene coordinate element specified by the user.

54. The system of claim 35, wherein the user designates lines on each plane in the screen image of the panoramic view which is to be modeled, and the program module for estimating plane normals and line directions for planes in the 3D scene comprises sub-modules for:
 deriving the direction of lines in the 3D scene corresponding to each of the user designated lines in the screen image using the camera orientation matrix; and
 deriving a normal for each plane in the 3D scene that corresponds to a plane of the screen image on which the user has designated lines, using the derived 3D scene line directions associated with that plane.

55. The system of claim 54, wherein the program module for estimating plane normals and line directions for planes in the 3D scene further comprises sub-modules for:
 ascertaining whether the user has designated a sufficient number of lines on a plane in the screen image to derive the line directions and plane normal associated with the corresponding plane in the 3D scene; and
 prompting the user to designate additional lines on a plane in the screen image whenever it is ascertained there are not a sufficient number to derive the line directions and plane normal associated with the corresponding plane in the 3D scene.

56. The system of claim 55, wherein the ascertaining sub-module comprises a sub-module for ascertaining whether the user has designated one of (i) at least two sets of parallel lines on the plane, or (ii) at least three lines of a rectangle on the plane.

57. The system of claim 54, wherein the sub-module for deriving the direction of lines in the 3D scene corresponding to each of the user designated lines in the screen image comprises a sub-module for deriving the direction of lines on planes to be modeled in the 3D scene using two pairs of parallel lines designated by the user as being on the corresponding plane in the screen image.

58. The system of claim 57, wherein the sub-module for deriving the direction of lines on planes to be modeled in the 3D scene comprises sub-modules for:
 identifying the coordinates of two points on each line in the panoramic view that corresponds to the two pairs of parallel lines designated by the user in the screen image;
 computing a normal for each of the projection planes associated with the two pairs of parallel lines in the panoramic view, each projection plane being defined by the two identified points and a camera center associated with the panoramic view;
 computing a line direction for each pair of parallel lines in the panoramic view using the computed projection plane normals associated with that pair of parallel lines; and
 computing the line direction in each plane in the 3D scene corresponding to each pair of parallel lines in the panoramic view using the computed panoramic view line directions and the camera orientation matrix.

59. The system of claim 58, wherein the coordinates of the two points identified on each line in the panoramic view correspond to the coordinates of the two end points of each line.

60. The system of claim 54, wherein the sub-module for deriving the direction of lines in the 3D scene corresponding to each of the user designated lines in the screen image comprises a sub-module for deriving the direction of lines on planes to be modeled in the 3D scene using three lines of a rectangle designated by the user as being on the corresponding plane in the screen image.

61. The system of claim 60, wherein the sub-module for deriving the direction of lines on planes to be modeled in the 3D scene comprises sub-modules for:

identifying the coordinates of two points on each line in the panoramic view that corresponds to the three lines of the rectangle designated by the user in the screen image;

computing a normal for each of the projection planes associated with the three lines of the rectangle in the panoramic view, each projection plane being defined by the two identified points and a camera center associated with the panoramic view;

computing a line direction for two lines of the three lines of the rectangle in the panoramic view that are parallel using the computed projection plane normals associated with the pair of parallel lines; and computing the line direction in each plane in the 3D scene corresponding to the pair of parallel lines in the panoramic view using the computed panoramic view line direction and the camera orientation matrix;

computing a 3D scene projection of the projection plane normal associated with the remaining, non-parallel line of the three lines of the rectangle using the camera orientation matrix;

computing a line direction for a line in the 3D scene corresponding to the remaining, non-parallel line of the three lines of the rectangle in the panoramic view using the previously computed line direction of the pair of parallel lines in the 3D scene and the previously computed 3D scene projection of the projection plane normal associated with the remaining, non-parallel line.

62. The system of claim 61, wherein the coordinates of the two points identified on each line in the panoramic view correspond to the coordinates of the two end points of each line.

63. The system of claim 35, wherein the user specifies the 3D scene coordinates of at least two points identified by the user in the screen image, and the program module for recovering the camera translation comprises sub-modules for:

characterizing the conversion of a point in the 3D scene to a corresponding point in the panoramic view using the relationship, $(x-t) \times R^T x' = 0$, which is equivalent to, $(x-t) \cdot (R^T p_j') = 0$, $j=0,1,2$ where x represents the coordinates of a point in the 3D scene, t represents the camera translation, R represents the camera orientation matrix, x' represents the coordinates of a point in the panoramic view which corresponds to a point x in the 3D scene and $p_0' = (-x_2, x_1, 0)$, $p_1' = (-x_3, 0, x_1)$ and $p_2'' = (0, -x_3, x_2)$ represent three directions perpendicular to a ray from the camera center through the point $x' = (x_1, x_2, x_3)$;

creating a system of linear equation based on the characterizing relationship using the at least two user specified points; and estimating the camera translation from the system of linear equations using a least-squares approach.

64. The system of claim 35, wherein the user designates ones of, 3D scene coordinates of points corresponding to points identified by the user in the screen image, plane normals associated with planes in the 3D scene that correspond to planes identified by the user in the screen image, directions of lines in the 3D scene that correspond to lines identified by the user in the screen image, plane distances associated with planes in the 3D scene that correspond to planes identified by the user in the screen image, and planes in the screen image that correspond to parallel planes of the 3D scene, and wherein the program module for estimating plane distances and vertex point locations for each plane in the 3D scene which is to be modeled comprises sub-modules for:

characterizing the 3D scene as at least one set of connected planes, each set being subject to a series of geometric constraints;

creating a system of linear geometric constraint equations based on the characterizing constraints for each set of connected planes in the 3D scene which are to be modeled; and estimating the unknown plane distances and vertex points for each set of connected planes in the 3D scene which is to be modeled from the system of equations using a least-squares approach.

65. The system of claim 64, wherein the system of constraints employed in the characterizing step comprises:

| | |
|---|---|
| Known point | $x_i''$, |
| Known plane | $d_i''$, |
| Distance | |
| Parallel planes | $d_i - d_j$ = Const., |
| Point/model | $(x - t) \cdot p_j = 0$, |
| Point/plane | $x_i \cdot n_k'' + d_k = 0$, |
| Point/plane | $x_i \cdot n_k + d_k = 0$, |
| Points/line | $(x_i - x_j) \times m'' = 0$, |
| Points/line | $(x_i - x_j) \times m = 0$, |
| Known length | $x_i - x_j = cm''$, |
| Known length | $x_i - x_j = cm$ | where x" represents the coordinates of a point in the 3D scene designated by the user and x represents the unknown coordinates of a point in the 3D scene, d" represents a distance from the origin of the 3D scene to a plane in the scene as designated by the user and d represents an unknown distance from the origin of the 3D scene to a plane in the scene, t represents the camera translation, $p_j$ represents $p_0 = (-x_2, x_1, 0)$, $p_1 = (-x_3, 0, x_1)$ and $p_2 = (0, -x_3, x_2)$ which correspond to three directions perpendicular to a ray from the camera center through the point $x = (x_1, x_2, x_3)$, n" represents a normal of a plane in the 3D scene designated by the user and n represents the estimated normal of a plane in the 3D scene, m" represents a direction of a line in the 3D scene designated by the user and m represents the estimated direction of a line in the 3D scene, and c represents a scaling factor.

66. The system of claim 65, wherein the creating sub-module comprises a sub-module for using the user designated points, plane normals, line directions, plane distances and parallel plane designations, as well as the estimated plane normals and line directions to create the system of equations.

67. The system of claim 66, wherein the camera translation has been previously estimated and the creating sub-module further comprises a sub-module for using the estimated camera translation to create the system of equations.

68. The system of claim 66, wherein the camera translation is unknown and estimated along with the unknown plane distances and vertex point locations from the system of equations using the least-squares approach.

69. A computer-readable memory for constructing a model of a 3D scene from a panoramic view of the scene, comprising:

a computer-readable storage medium; and a computer program comprising program modules stored in the storage medium, wherein the storage medium is so configured by the computer program that it causes the computer to, display an image of the panoramic view of the 3D scene on a computer monitor screen, recover a camera orientation matrix of the panoramic view based on lines associated with at least one plane of the 3D scene as specified by a user of the computing device, estimate plane normals and line directions for planes in the 3D scene which are to be modeled using the camera orientation matrix, recover a camera translation using the camera orientation matrix, wherein the camera translation is the difference between the camera projection center and the coordinate origin of the 3D scene, estimate unknown plane distances and vertex point locations for each plane in the 3D scene which is to be modeled using the estimated plane normals and line directions, construct a model of the 3D scene consisting of at least one set of connected planes based on the plane normal and plane distance, and/or the vertex point locations, of each plane in the set.

70. The computer-readable memory of claim 69, wherein the user designates lines on at least one plane in the screen image of the panoramic view of the 3D scene and identifies the direction of lines in the 3D scene which correspond to each of the designated lines in the screen image, and wherein the program module for recovering the camera orientation matrix comprises a sub-module for determining the camera orientation matrix using the designated lines and identified line directions.

71. The computer-readable memory of claim 70, wherein the program module for recovering the camera orientation matrix further comprises sub-modules for:

ascertaining whether the user has designated a sufficient number of lines on the at least one plane to determine the camera orientation matrix; and prompting the user to designate additional lines on the at least one plane whenever it is ascertained there are not a sufficient number to determine the camera orientation matrix.

72. The computer-readable memory of claim 71, wherein the ascertaining sub-module comprises a sub-module for ascertaining whether the user has designated one of (i) lines on a plane corresponding to at least two vertical lines and one horizontal line of the 3D scene, (ii) lines on a plane corresponding to at least two horizontal lines and one vertical line of the 3D scene, or (iii) lines on planes corresponding to at least two sets of parallel lines of the 3D scene and the direction of each set of parallel lines in the 3D scene.

73. The computer-readable memory of claim 70, wherein the determining sub-module comprises a sub-module for deriving the camera orientation matrix from lines on a plane corresponding to at least two vertical lines and one horizontal line of the 3D scene, as designated by the user.

74. The computer-readable memory of claim 73, wherein the deriving sub-module comprises sub-modules for:

identifying the coordinates of two points on each line in the panoramic view that corresponds to the at least two vertical lines and one horizontal line designated by the user in the screen image;

computing a normal for each of the projection planes associated with said lines in the panoramic view, each projection plane being defined by the two identified points and a camera center associated with the panoramic view;

computing a Z-axis element of the camera orientation matrix using the computed projection plane normals associated with each of the designated vertical lines;

computing an X-axis element of the camera orientation matrix using the computed Z-axis element and the projection plane normal associated with the designated horizontal line; and computing a Y-axis element of the camera orientation matrix using the computed Z-axis and X-axis elements.

75. The computer-readable memory of claim 74, wherein the user designated more than two vertical lines on the plane, and wherein the sub-module for computing the Z-axis element of the camera orientation matrix comprises a sub-module for using a minimum eigenvalue problem approach to compute the Z-axis element.

76. The computer-readable memory of claim 74, wherein the coordinates of the two points identified on each line in the panoramic view correspond to the coordinates of the two end points of each line.

77. The computer-readable memory of claim 70, wherein the determining sub-module comprises a sub-module for deriving the camera orientation matrix from lines on a plane corresponding to at least two horizontal lines and one vertical line of the 3D scene, as designated by the user.

78. The computer-readable memory of claim 77, wherein the deriving sub-module comprises sub-modules for:

identifying the coordinates of two points on each line in the panoramic view that corresponds to the at least two horizontal lines and one vertical line designated by the user in the screen image;

computing a normal for each of the projection planes associated with said lines in the panoramic view, each projection plane being defined by the two identified points and a camera center associated with the panoramic view;

computing an X-axis element of the camera orientation matrix using the computed projection plane normals associated with each of the designated horizontal lines;

computing a Z-axis element of the camera orientation matrix using the computed X-axis element and the projection plane normal associated with the designated vertical line; and computing a Y-axis element of the camera orientation matrix using the computed X-axis and Z-axis elements.

79. The computer-readable memory of claim 78, wherein the user designated more than two horizontal lines on the plane, and wherein the sub-module for computing the X-axis element of the camera orientation matrix comprises a sub-module for using a minimum eigenvalue problem approach to compute the X-axis element.

80. The computer-readable memory of claim 78, wherein the coordinates of the two points identified on each line in the panoramic view correspond to the coordinates of the two end points of each line.

81. The computer-readable memory of claim 70, wherein the determining sub-module comprises a sub-module for deriving the camera orientation matrix from at least two sets of parallel lines on one or more planes and the direction of each of the parallel lines in the 3D scene, as designated by the user.

82. The computer-readable memory of claim 81, wherein the deriving sub-module comprises sub-modules for:

identifying the coordinates of two points on each line in the panoramic view that corresponds to the at least two sets of parallel lines designated by the user in the screen image;

computing a normal for each of the projection planes associated with said lines in the panoramic view, each projection plane being defined by the two identified points and a camera center associated with the panoramic view;

computing a line direction for each set of parallel lines in the panoramic view using the computed projection plane normals associated with that set of parallel lines;

computing the camera orientation matrix from the computed panoramic view line direction for each set of parallel lines and the line direction of each corresponding set of parallel lines in the 3D scene as designated by the user using a maximum eigenvalue problem approach.

83. The computer-readable memory of claim 82, wherein the user designated more than two parallel lines in a set of parallel lines, and wherein the sub-module for computing a line direction for each set of parallel lines in the panoramic view comprises a sub-module for using a minimum eigenvector problem approach to compute the line direction for each set of parallel lines.

84. The computer-readable memory of claim 82, wherein the coordinates of the two points identified on each line in the panoramic view correspond to the coordinates of the two end points of each line.

85. The computer-readable memory of claim 70 wherein an element of the determined camera orientation matrix may be reversed in sign in comparison to the actual camera orientation matrix, and wherein the camera orientation matrix recovery sub-module further comprises a sub-module for resolving any sign ambiguity existing in the determined camera orientation matrix.

86. The computer-readable memory of claim 85, wherein the user specifies the direction of each previously designated line associated with the plane of the 3D scene as it appears in the panoramic view of the scene.

87. The computer-readable memory of claim 85, wherein the user specifies the 3D scene coordinates of at least two points identified by the user in the screen image and the resolving sub-module comprises a sub-modules for:

computing the 3D scene coordinates of the points identified by the user in the screen image by projecting the panoramic view coordinates of these points obtained from the screen image to the 3D scene using the camera orientation matrix;

comparing the computed 3D scene coordinates with the coordinates specified by the user; and reversing the sign of any of the determined camera orientation matrix elements corresponding to a computed 3D scene coordinate element that has a different sign than the corresponding 3D scene coordinate element specified by the user.

88. The computer-readable memory of claim 69, wherein the user designates lines on each plane in the screen image of the panoramic view which is to be modeled, and the program module for estimating plane normals and line directions for planes in the 3D scene comprises sub-modules for:

deriving the direction of lines in the 3D scene corresponding to each of the user designated lines in the screen image using the camera orientation matrix; and deriving a normal for each plane in the 3D scene that corresponds to a plane of the screen image on which the user has designated lines, using the derived 3D scene line directions associated with that plane.

89. The computer-readable memory of claim 88, wherein the program module for estimating plane normals and line directions for planes in the 3D scene further comprises sub-modules for:

ascertaining whether the user has designated a sufficient number of lines on a plane in the screen image to derive the line directions and plane normal associated with the corresponding plane in the 3D scene; and prompting the user to designate additional lines on a plane in the screen image whenever it is ascertained there are not a sufficient number to derive the line directions and plane normal associated with the corresponding plane in the 3D scene.

90. The computer-readable memory of claim 89, wherein the ascertaining sub-module comprises a sub-module for ascertaining whether the user has designated one of (i) at least two sets of parallel lines on the plane, or (ii) at least three lines of a rectangle on the plane.

91. The computer-readable memory of claim 88, wherein the sub-module for deriving the direction of lines in the 3D scene corresponding to each of the user designated lines in the screen image comprises a sub-module for deriving the direction of lines on planes to be modeled in the 3D scene using two pairs of parallel lines designated by the user as being on the corresponding plane in the screen image.

92. The computer-readable memory of claim 91, wherein the sub-module for deriving the direction of lines on planes to be modeled in the 3D scene comprises sub-modules for:

identifying the coordinates of two points on each line in the panoramic view that corresponds to the two pairs of parallel lines designated by the user in the screen image;

computing a normal for each of the projection planes associated with the two pairs of parallel lines in the panoramic view, each projection plane being defined by the two identified points and a camera center associated with the panoramic view;

computing a line direction for each pair of parallel lines in the panoramic view using the computed projection plane normals associated with that pair of parallel lines; and computing the line direction in each plane in the 3D scene corresponding to each pair of parallel lines in the panoramic view using the computed panoramic view line directions and the camera orientation matrix.

93. The computer-readable memory of claim 92, wherein the coordinates of the two points identified on each line in the panoramic view correspond to the coordinates of the two end points of each line.

94. The computer-readable memory of claim 88, wherein the sub-module for deriving the direction of lines in the 3D scene corresponding to each of the user designated lines in the screen image comprises a sub-module for deriving the direction of lines on planes to be modeled in the 3D scene using three lines of a rectangle designated by the user as being on the corresponding plane in the screen image.

95. The computer-readable memory of claim 94, wherein the sub-module for deriving the direction of lines on planes to be modeled in the 3D scene comprises sub-modules for:

identifying the coordinates of two points on each line in the panoramic view that corresponds to the three lines of the rectangle designated by the user in the screen image;

computing a normal for each of the projection planes associated with the three lines of the rectangle in the panoramic view, each projection plane being defined by the two identified points and a camera center associated with the panoramic view;

computing a line direction for two lines of the three lines of the rectangle in the panoramic view that are parallel using the computed projection plane normals associated with the pair of parallel lines; and computing the line direction in each plane in the 3D scene corresponding to the pair of parallel lines in the panoramic view using the computed panoramic view line direction and the camera orientation matrix;

computing a 3D scene projection of the projection plane normal associated with the remaining, non-parallel line of the three lines of the rectangle using the camera orientation matrix;

computing a line direction for a line in the 3D scene corresponding to the remaining, non-parallel line of the three lines of the rectangle in the panoramic view using the previously computed line direction of the pair of parallel lines in the 3D scene and the previously computed 3D scene projection of the projection plane normal associated with the remaining, non-parallel line.

96. The computer-readable memory of claim 95, wherein the coordinates of the two points identified on each line in the panoramic view correspond to the coordinates of the two end points of each line.

97. The computer-readable memory of claim 69, wherein the user specifies the 3D scene coordinates of at least two points identified by the user in the screen image, and the program module for recovering the camera translation comprises sub-modules for:

characterizing the conversion of a point in the 3D scene to a corresponding point in the panoramic view using the relationship,
$(x-t) \times R^T x' = 0$, which is equivalent to,
$(x-t) \cdot (R^T p_j') = 0$, $j=0,1,2$ where x represents the coordinates of a point in the 3D scene, t represents the camera translation, R represents the camera orientation matrix, x' represents the coordinates of a point in the panoramic view which corresponds to a point x in the 3D scene and $p_0'=(-x_2, x_1, 0)$, $p_1'=(-x_3, 0, x_1)$ and $p_2''(0, -x_3, x_2)$ represent three directions perpendicular to a ray from the camera center through the point $x'=(x_1, x_2, x_3)$;

creating a system of linear equation based on the characterizing relationship using the at least two user specified points; and estimating the camera translation from the system of linear equations using a least-squares approach.

98. The computer-readable memory of claim 69, wherein the user designates ones of, 3D scene coordinates of points corresponding to points identified by the user in the screen image, plane normals associated with planes in the 3D scene that correspond to planes identified by the user in the screen image, directions of lines in the 3D scene that correspond to lines identified by the user in the screen image, plane distances associated with planes in the 3D scene that correspond to planes identified by the user in the screen image, and planes in the screen image that correspond to parallel planes of the 3D scene, and wherein the program module for estimating plane distances and vertex point locations for each plane in the 3D scene which is to be modeled comprises sub-modules for:

characterizing the 3D scene as at least one set of connected planes, each set being subject to a series of geometric constraints;

creating a system of linear geometric constraint equations based on the characterizing constraints for each set of connected planes in the 3D scene which are to be modeled; and estimating the unknown plane distances and vertex points for each set of connected planes in the 3D scene which is to be modeled from the system of equations using a least-squares approach.

99. The computer-readable memory of claim 98, wherein the system of constraints employed in the characterizing step comprises:

| | |
|---|---|
| Known point | $x_i''$, |
| Known plane | $d_i''$, |
| Distance | |
| Parallel planes | $d_i - d_j = $ Const., |
| Point/model | $(x - t) \cdot p_j = 0$, |
| Point/plane | $x_i \cdot n_k'' + d_k = 0$, |
| Point/plane | $x_i \cdot n_k + d_k = 0$, |
| Points/line | $(x_i - x_j) \times m'' = 0$, |
| Points/line | $(x_i - x_j) \times m = 0$, |
| Known length | $x_i - x_j = cm''$, |
| Known length | $x_i - x_j = cm$ | where x" represents the coordinates of a point in the 3D scene designated by the user and x represents the unknown coordinates of a point in the 3D scene, d" represents a distance from the origin of the 3D scene to a plane in the scene as designated by the user and d represents an unknown distance from the origin of the 3D scene to a plane in the scene, t represents the camera translation, $p_j$ represents $p_0=(-x_2, x_1, 0)$, $p_1=(-x_3, 0, x_1)$ and $p_2=(0, -x_3, x_2)$ which correspond to three directions perpendicular to a ray from the camera center through the point $x=(x_1, x_2, x_3)$, n" represents a normal of a plane in the 3D scene designated by the user and n represents the estimated normal of a plane in the 3D scene, m" represents a direction of a line in the 3D scene designated by the user and m represents the estimated direction of a line in the 3D scene, and c represents a scaling factor.

100. The computer-readable memory of claim 99, wherein the creating sub-module comprises a sub-module for using the user designated points, plane normals, line directions, plane distances and parallel plane designations, as well as the estimated plane normals and line directions to create the system of equations.

101. The computer-readable memory of claim 100, wherein the camera translation has been previously estimated and the creating sub-module further comprises a sub-module for using the estimated camera translation to create the system of equations.

102. The computer-readable memory of claim 100, wherein the camera translation is unknown and estimated along with the unknown plane distances and vertex point locations from the system of equations using the least-squares approach.

103. A system for constructing a model of a 3D scene from a panoramic view of the scene, comprising:

a general purpose computing device;

an interface for dynamically interfacing a user to the computing device, wherein the user is provided with a display of an image of the panoramic view of the 3D scene on a computer monitor screen, the user then specifying features on the screen image;

a computer program comprising program modules executable by the computing device, wherein the computing device is directed by the program modules of the computer program to, recover a camera orientation matrix of the panoramic view based on the features specified by the user, estimate plane normals and line directions for planes in the 3D scene which are to be modeled using the camera orientation matrix, recover a camera translation using the camera orientation matrix, wherein the camera translation is the difference between the camera projection center and the coordinate origin of the 3D scene, estimate unknown plane distances and vertex point locations for each plane in the 3D scene which is to be modeled using the estimated plane normals and line directions, and construct a model of the 3D scene consisting of at least one set of connected planes based on the plane normal and plane distance, and/or the vertex point locations, of each plane in the set.

104. The system of claim 103, wherein the user specified features comprise lines on at least one plane in the screen image of the panoramic view of the 3D scene and the direction of lines in the 3D scene which correspond to each of the designated lines in the screen image, and wherein the program module for recovering the camera orientation matrix comprises a sub-module for determining the camera orientation matrix using the user specified lines and line directions.

105. The system of claim 104, wherein the interface further comprises a prompting image to provide the user with information concerning the designation of additional lines whenever the number of lines designated by the user is insufficient to determine the camera orientation matrix, and wherein the program module for recovering the camera orientation matrix further comprises sub-modules for:

ascertaining whether the user has designated a sufficient number of lines on the at least one plane to determine the camera orientation matrix; and prompting the user via the interface to designate additional lines on the at least one plane whenever it is ascertained there are not a sufficient number to determine the camera orientation matrix.

106. The system of claim 105, wherein the ascertaining sub-module comprises a sub-module for ascertaining whether the user has designated one of (i) lines on a plane corresponding to at least two vertical lines and one horizontal line of the 3D scene, (ii) lines on a plane corresponding to at least two horizontal lines and one vertical line of the 3D scene, or (iii) lines on planes corresponding to at least two sets of parallel lines of the 3D scene and the direction of each set of parallel lines in the 3D scene.

107. The system of claim 104, wherein the determining sub-module comprises a sub-module for deriving the camera orientation matrix from lines on a plane corresponding to at least two vertical lines and one horizontal line of the 3D scene, as designated by the user via the interface.

108. The system of claim 107 wherein the deriving sub-module comprises sub-modules for:

identifying the coordinates of two points on each line in the panoramic view that corresponds to the at least two vertical lines and one horizontal line designated by the user in the screen image;

computing a normal for each of the projection planes associated with said lines in the panoramic view, each projection plane being defined by the two identified points and a camera center associated with the panoramic view;

computing a Z-axis element of the camera orientation matrix using the computed projection plane normals associated with each of the designated vertical lines;

computing an X-axis element of the camera orientation matrix using the computed Z-axis element and the projection plane normal associated with the designated horizontal line; and computing a Y-axis element of the camera orientation matrix using the computed Z-axis and X-axis elements.

109. The system of claim 108, wherein the user specified features comprise more than two vertical lines on the plane, and wherein the sub-module for computing the Z-axis element of the camera orientation matrix comprises a sub-module for using a minimum eigenvalue problem approach to compute the Z-axis element.

110. The system of claim 108, wherein the coordinates of the two points identified on each line in the panoramic view correspond to the coordinates of the two end points of each line.

111. The system of claim 104, wherein the determining sub-module comprises a sub-module for deriving the camera orientation matrix from lines on a plane corresponding to at least two horizontal lines and one vertical line of the 3D scene, as designated by the user via the interface.

112. The system of claim 111, wherein the deriving sub-module comprises sub-modules for:

identifying the coordinates of two points on each line in the panoramic view that corresponds to the at least two horizontal lines and one vertical line designated by the user in the screen image;

computing a normal for each of the projection planes associated with said lines in the panoramic view, each projection plane being defined by the two identified points and a camera center associated with the panoramic view;

computing an X-axis element of the camera orientation matrix using the computed projection plane normals associated with each of the designated horizontal lines;

computing a Z-axis element of the camera orientation matrix using the computed X-axis element and the projection plane normal associated with the designated vertical line; and computing a Y-axis element of the camera orientation matrix using the computed X-axis and Z-axis elements.

113. The system of claim 112, wherein the user specified features comprise more than two horizontal lines on the plane, and wherein the sub-module for computing the X-axis element of the camera orientation matrix comprises a sub-module for using a minimum eigenvalue problem approach to compute the X-axis element.

114. The system of claim 112, wherein the coordinates of the two points identified on each line in the panoramic view correspond to the coordinates of the two end points of each line.

115. The system of claim 104, wherein the user specified features comprise the direction of each of the parallel lines in the 3D scene, and wherein the determining sub-module comprises a sub-module for deriving the camera orientation matrix from at least two sets of parallel lines on one or more planes and the direction of each of the parallel lines in the 3D scene, as designated by the user via the interface.

116. The system of claim 115, wherein the deriving sub-module comprises sub-modules for:

identifying the coordinates of two points on each line in the panoramic view that corresponds to the at least two sets of parallel lines designated by the user in the screen image;

computing a normal for each of the projection planes associated with said lines in the panoramic view, each projection plane being defined by the two identified points and a camera center associated with the panoramic view;

computing a line direction for each set of parallel lines in the panoramic view using the computed projection plane normals associated with that set of parallel lines;

computing the camera orientation matrix from the computed panoramic view line direction for each set of parallel lines and the line direction of each corresponding set of parallel lines in the 3D scene as designated by the user using a maximum eigenvalue problem approach.

117. The system of claim 116, wherein the user specified features comprise more than two parallel lines in a set of parallel lines, and wherein the sub-module for computing a line direction for each set of parallel lines in the panoramic view comprises a sub-module for using a minimum eigenvector problem approach to compute the line direction for each set of parallel lines.

118. The system of claim 116, wherein the coordinates of the two points identified on each line in the panoramic view correspond to the coordinates of the two end points of each line.

119. The system of claim 104 wherein an element of the determined camera orientation matrix may be reversed in sign in comparison to the actual camera orientation matrix, and wherein the camera orientation matrix recovery sub-module further comprises a sub-module for resolving any sign ambiguity existing in the determined camera orientation matrix.

120. The system of claim 119, wherein the user specified features comprise the direction of each previously designated line associated with a plane of the 3D scene as it appears in the panoramic view of the scene.

121. The system of claim 119, wherein the user specified features comprise the 3D scene coordinates of at least two points identified by the user in the screen image, and wherein the resolving sub-module comprises a sub-modules for:

computing the 3D scene coordinates of the points identified by the user in the screen image by projecting the panoramic view coordinates of these points obtained from the screen image to the 3D scene using the camera orientation matrix;

comparing the computed 3D scene coordinates with the coordinates specified by the user; and reversing the sign of any of the determined camera orientation matrix elements corresponding to a computed 3D scene coordinate element that has a different sign than the corresponding 3D scene coordinate element specified by the user.

122. The system of claim 103, wherein the user designates lines on each plane in the screen image of the panoramic view which is to be modeled, and the program module for estimating plane normals and line directions for planes in the 3D scene comprises sub-modules for:

deriving the direction of lines in the 3D scene corresponding to each of the user designated lines in the screen image using the camera orientation matrix; and deriving a normal for each plane in the 3D scene that corresponds to a plane of the screen image on which the user has designated lines, using the derived 3D scene line directions associated with that plane.

123. The system of claim 122, wherein the interface further comprises a prompting image to provide the user with information concerning the designation of additional lines whenever the number of lines designated by the user is insufficient to derive the line directions and plane normal associated with a corresponding plane in the 3D scene, and wherein the program module for estimating plane normals and line directions for planes in the 3D scene further comprises sub-modules for:

ascertaining whether the user has designated a sufficient number of lines on a plane in the screen image to derive the line directions and plane normal associated with the corresponding plane in the 3D scene; and prompting the user via the interface to designate additional lines on a plane in the screen image whenever it is ascertained there are not a sufficient number to derive the line directions and plane normal associated with the corresponding plane in the 3D scene.

124. The system of claim 123, wherein the ascertaining sub-module comprises a sub-module for ascertaining whether the user has designated one of (i) at least two sets of parallel lines on the plane, or (ii) at least three lines of a rectangle on the plane.

125. The system of claim 122, wherein the user specified features comprise designating two pairs of parallel lines on at least one plane in the screen image, and wherein the sub-module for deriving the direction of lines in the 3D scene corresponding to each of the user designated lines in the screen image comprises a sub-module for deriving the direction of lines on planes to be modeled in the 3D scene using the two pairs of parallel lines designated by the user on the corresponding plane in the screen image.

126. The system of claim 125, wherein the sub-module for deriving the direction of lines on planes to be modeled in the 3D scene comprises sub-modules for:

identifying the coordinates of two points on each line in the panoramic view that corresponds to the two pairs of parallel lines designated by the user in the screen image;

computing a normal for each of the projection planes associated with the two pairs of parallel lines in the panoramic view, each projection plane being defined by the two identified points and a camera center associated with the panoramic view;

computing a line direction for each pair of parallel lines in the panoramic view using the computed projection plane normals associated with that pair of parallel lines; and computing the line directions in each plane in the 3D scene corresponding to each pair of parallel lines in the panoramic view using the computed panoramic view line directions and the camera orientation matrix.

127. The system of claim 126, wherein the coordinates of the two points identified on each line in the panoramic view correspond to the coordinates of the two end points of each line.

128. The system of claim 122, wherein the user specified features comprise designating three lines of a rectangle on at least one plane in the screen image, and wherein the sub-module for deriving the direction of lines in the 3D scene corresponding to each of the user designated lines in the screen image comprises a sub-module for deriving the direction of lines on planes to be modeled in the 3D scene using the three lines of a rectangle designated by the user on the corresponding plane in the screen image.

129. The system of claim 128, wherein the sub-module for deriving the direction of lines on planes to be modeled in the 3D scene comprises sub-modules for:

identifying the coordinates of two points on each line in the panoramic view that corresponds to the three lines of the rectangle designated by the user in the screen image;

computing a normal for each of the projection planes associated with the three lines of the rectangle in the panoramic view, each projection plane being defined by the two identified points and a camera center associated with the panoramic view;

computing a line direction for two lines of the three lines of the rectangle in the panoramic view that are parallel using the computed projection plane normals associated with the pair of parallel lines; and computing the line direction in each plane in the 3D scene corresponding to the pair of parallel lines in the panoramic view using the computed panoramic view line direction and the camera orientation matrix;

computing a 3D scene projection of the projection plane normal associated with the remaining, non-parallel line of the three lines of the rectangle using the camera orientation matrix;

computing a line direction for a line in the 3D scene corresponding to the remaining, non-parallel line of the three lines of the rectangle in the panoramic view using the previously computed line direction of the pair of parallel lines in the 3D scene and the previously computed 3D scene projection of the projection plane normal associated with the remaining, non-parallel line.

130. The system of claim 129, wherein the coordinates of the two points identified on each line in the panoramic view correspond to the coordinates of the two end points of each line.

131. The system of claim 103, wherein the user specified features comprise specifying the 3D scene coordinates of at least two points identified by the user in the screen image, and the program module for recovering the camera translation comprises sub-modules for:

characterizing the conversion of a point in the 3D scene to a corresponding point in the panoramic view using the relationship, $(x-t) \times R^T x' = 0$, which is equivalent to, $(x-t) \cdot (R^T p_j') = 0$, $j=0,1,2$ where x represents the coordinates of a point in the 3D scene, t represents the camera translation, R represents the camera orientation matrix, x' represents the coordinates of a point in the panoramic view which corresponds to a point x in the 3D scene and $p_0' = (-x_2, x_1, 0)$, $p_1' = (-x_3, 0, x_1)$ and $p_2'' = (0, -x_3, x_2)$ represent three directions perpendicular to a ray from the camera center through the point $x' = (x_1, x_2, x_3)$;

creating a system of linear equation based on the characterizing relationship using the at least two user specified points; and estimating the camera translation from the system of linear equations using a least-squares approach.

132. The system of claim 103, wherein the user specified features comprise designating ones of, 3D scene coordinates of points corresponding to points identified by the user in the screen image, plane normals associated with planes in the 3D scene that correspond to planes identified by the user in the screen image, directions of lines in the 3D scene that correspond to lines identified by the user in the screen image, plane distances associated with planes in the 3D scene that correspond to planes identified by the user in the screen image, and planes in the screen image that correspond to parallel planes of the 3D scene, and wherein the program module for estimating plane distances and vertex point locations for each plane in the 3D scene which is to be modeled comprises sub-modules for:

characterizing the 3D scene as at least one set of connected planes, each set being subject to a series of geometric constraints;

creating a system of linear geometric constraint equations based on the characterizing constraints for each set of connected planes in the 3D scene which are to be modeled; and estimating the unknown plane distances and vertex points for each set of connected planes in the 3D scene which is to be modeled from the system of equations using a least-squares approach.

133. The system of claim 132, wherein the system of constraints employed in the characterizing step comprises:

| | |
|---|---|
| Known point | $x_i''$, |
| Known plane | $d_i''$, |
| Distance | |
| Parallel planes | $d_i - d_j = $ Const., |
| Point/model | $(x - t) \cdot p_j = 0$, |
| Point/plane | $x_i \cdot n_k'' + d_k = 0$, |
| Point/plane | $x_i \cdot n_k + d_k = 0$, |
| Points/line | $(x_i - x_j) \times m'' = 0$, |
| Points/line | $(x_i - x_j) \times m = 0$, |
| Known length | $x_i - x_j = cm''$, |
| Known length | $x_i - x_j = cm$ | where x" represents the coordinates of a point in the 3D scene designated by the user and x represents the unknown coordinates of a point in the 3D scene, d" represents a distance from the origin of the 3D scene to a plane in the scene as designated by the user and d represents an unknown distance from the origin of the 3D scene to a plane in the scene, t represents the camera translation, $p_j$ represents $p_0 = (-x_2, x_1, 0)$, $p_1 = (-x_3, 0, x_1)$ and $p_2 = (0, -x_3, x_2)$ which correspond to three directions perpendicular to a ray from the camera center through the point $x = (x_1, x_2, x_3)$, n" represents a normal of a plane in the 3D scene designated by the user and n represents the estimated normal of a plane in the 3D scene, m" represents a direction of a line in the 3D scene designated by the user and m represents the estimated direction of a line in the 3D scene, and c represents a scaling factor.

134. The system of claim 133, wherein the creating sub-module comprises a sub-module for using the user designated points, plane normals, line directions, plane distances and parallel plane designations, as well as the estimated plane normals and line directions to create the system of equations.

135. The system of claim 134, wherein the camera translation has been previously estimated and the creating sub-module further comprises a sub-module for using the estimated camera translation to create the system of equations.

136. The system of claim 134, wherein the camera translation is unknown and estimated along with the unknown plane distances and vertex point locations from the system of equations using the least-squares approach.

* * * * *